US008965745B2

(12) United States Patent
Lepage

(10) Patent No.: US 8,965,745 B2
(45) Date of Patent: Feb. 24, 2015

(54) GRID FROM DEPOSITIONAL SPACE

(75) Inventor: Francois Lepage, Montpellier (FR)

(73) Assignee: Schlumberger Technology Corporation, Sugar Land, TX (US)

(*) Notice: Subject to any disclaimer, the term of this patent is extended or adjusted under 35 U.S.C. 154(b) by 325 days.

(21) Appl. No.: 13/443,972

(22) Filed: Apr. 11, 2012

(65) Prior Publication Data

US 2012/0265510 A1    Oct. 18, 2012

(30) Foreign Application Priority Data

Apr. 14, 2011 (EP) .................................. 11162524

(51) Int. Cl.
*G06G 7/48* (2006.01)
*G01V 99/00* (2009.01)
*G06F 17/50* (2006.01)

(52) U.S. Cl.
CPC .......... *G01V 99/005* (2013.01); *G06F 17/5018* (2013.01); *G06F 2217/16* (2013.01)
USPC .......................................................... 703/10

(58) Field of Classification Search
CPC ............. G01V 1/00; G01V 1/28; G01V 1/30; G01V 9/00; G01V 99/00; G06F 3/048; G06F 7/60; G06F 15/18; G06F 17/10; G06F 17/17; G06F 17/50; G06F 19/00; G06G 7/48; G06G 7/50; G06G 7/57; G06K 9/40; G06K 9/46; G06K 9/62; G06T 15/00; G06T 17/00
USPC ..................... 703/9, 10; 345/419, 420; 702/16
See application file for complete search history.

(56) References Cited

U.S. PATENT DOCUMENTS 4,991,095 A * 2/1991 Swanson ........................ 702/16
5,740,342 A   4/1998 Kocberber
(Continued)

FOREIGN PATENT DOCUMENTS

EP   1533754 A1   5/2005
WO  2006113939 A1  10/2006

OTHER PUBLICATIONS

Moretti, Lepage and Guiton, KINE3D: a New 3D Restoration Method Based on a Mixed Approach Linking Geometry and Geomechanics, Oil & Gas Science and Technology—Rev. IFP, vol. 61 (2006), No. 2, pp. 277-289 (13 pages).
(Continued)

*Primary Examiner* — Kandasamy Thangavelu
(74) *Attorney, Agent, or Firm* — Rodney Warfford; Lam Nguyen Colinwier

(57) ABSTRACT

A method can include providing, in a geological domain, a conformal mesh, conformal to geological discontinuities of a geological model, that includes depositional domain coordinates associated with a depositional domain; providing, in the depositional domain, an initial, at least vertically structured, multidimensional grid that includes initial nodes that define grid cells; referencing the conformal mesh to identify a set of grid cells of the initial grid traversed by the geological discontinuities; splitting each of the grid cells in the set to form sub cells, each of the sub cells defined at least in part by one or more new nodes; and assigning geological domain coordinates associated with the geological domain to at least the new nodes to generate a final grid that includes the initial nodes, the new nodes and geological domain coordinates associated with the geological domain. Various other apparatuses, systems, methods, etc., are also disclosed.

22 Claims, 14 Drawing Sheets

(56) References Cited

U.S. PATENT DOCUMENTS

| | | | |
|---|---|---|---|
| 6,052,650 | A | 4/2000 | Assa et al. |
| 6,907,392 | B2 | 6/2005 | Bennis et al. |
| 7,123,258 | B2 | 10/2006 | Deny et al. |
| 7,248,259 | B2 | 7/2007 | Fremming |
| 7,526,418 | B2 * | 4/2009 | Pita et al. .................... 703/10 |
| 8,711,140 | B1 * | 4/2014 | Mallet ........................ 345/419 |
| 2002/0038201 | A1 | 3/2002 | Balaven et al. |
| 2003/0216897 | A1 | 11/2003 | Endres et al. |
| 2004/0220789 | A1 | 11/2004 | Thore et al. |
| 2005/0273303 | A1 | 12/2005 | Flandrin et al. |
| 2006/0197759 | A1 * | 9/2006 | Fremming ................. 345/420 |
| 2008/0021684 | A1 * | 1/2008 | Dulac et al. .................... 703/9 |
| 2009/0055141 | A1 | 2/2009 | Moncorge et al. |
| 2010/0138196 | A1 | 6/2010 | Hui et al. |
| 2010/0138202 | A1 | 6/2010 | Mallison et al. |
| 2011/0015910 | A1 | 1/2011 | Ran et al. |
| 2011/0054857 | A1 | 3/2011 | Moguchaya |
| 2011/0106507 | A1 | 5/2011 | Lepage |
| 2011/0313745 | A1 * | 12/2011 | Mezghani et al. .......... 703/10 |
| 2012/0029827 | A1 | 2/2012 | Pepper et al. |
| 2012/0136641 | A1 * | 5/2012 | Fung et al. .................. 703/10 |
| 2012/0173220 | A1 * | 7/2012 | Li et al. ....................... 703/10 |

OTHER PUBLICATIONS

ISR and Written Opinion of PCT/US2012/033476, Lepage/Schlumberger, of Oct. 23, 2012 (9 pages).

Levy et al. "Circular incident edge lists", Visualization VIS'01 Proceedings, 2001 (9 pages).

Moyen et al. "3D-Parameterization of the 3D Geological Space—Then Geochron Model", Proceedings of the 9th European Conference on the Mathematics of Oil Recovery, 2004 (8 pages).

Gringarten et al. "Advantages of Using Vertical Stair Step Faults in Reservoir Grids for Flow Simulation", SPE 119188, 2009 (8 pages).

Gringarten et al. "New Grids for Robust Reservoir Modeling", SPE 116649, 2008 (11 pages).

Mallison et al. "Unstructured Cut-Cell Grids for Modeling Complex Reservoirs", SPE 163642 (17 pages).

Lepage, Francois, "Generating 3-Dimensional Hybrid Modular Grids for Flow Simulations", Jun. 2003, Proceedings of the 23rd Gocad Meeting, Nancy, France.

Lepage, Francois, "Generating Three-Dimensional Semi-Unstructured Grids", Jun. 2001, Proceedings of the 21st Gocad Meeting, Nancy, France.

Balaven, Sophie et al., "Modular Hybrid Mesh Generation for Reservoir Flow Simulation", Sep. 2000, Proceedings of the 7th European Conference on the Mathematics of Oil Recovery, ECMOR' 2000.

Owen, Steven J. et al., "Pyramid Elements for Maintaining Tetrahedra to Hexahedra Conformability", Jul. 1997, pp. 123-129, AMD, vol. 220, Trends in Unstructured Mesh Generation, ASME.

Heinemann, Z.E., "Interactive Generation of Irregular Simulation Grids and Its Practical Applications", Aug. 1994, Centennial Petroleum Engineering Symposium, Tulsa, OK, U.S.A.

* cited by examiner

GRID FROM DEPOSITIONAL SPACE

RELATED APPLICATION

This application claims priority to and the benefit of European Patent Application No. EP 11162524.0, filed on Apr. 14, 2011, entitled "Method, System, Apparatus and Computer Readable Medium for Building a 3D Hybrid Grid from a Depositional Space," to inventor Francois Lepage, the disclosure of which is incorporated by reference herein in its entirety.

BACKGROUND

Phenomena associated with a sedimentary basin may be modeled using various equations. For application of a numerical technique, such equations may be discretized using a grid that includes nodes, cells, etc. Where a basin includes various types of features (e.g., stratigraphic layers, faults, etc.), nodes, cells, etc., of a grid may represent, or be assigned to, such features. In turn, discretized equations may better represent the basin and its features. Various technologies, techniques, etc., described herein pertain to grids.

SUMMARY

A method can include providing a mesh and a grid of nodes in a depositional domain and referencing the mesh to identify grid cells defined by the nodes of the grid for splitting where such splitting can form sub cells defined at least in part by one or more new nodes. One or more computer-readable storage media can include instructions to access a mesh, access a grid and split grid cells of the grid, in a depositional domain, based at least in part on the mesh. One or more computer-readable storage media can include instructions to access a grid that includes one or more unstructured portions defined at least in part by a mesh of a depositional domain, to assign properties to the grid and to perform a simulation using the grid and the properties. Various other apparatuses, systems, methods, etc., are also disclosed.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

Features and advantages of the described implementations can be more readily understood by reference to the following description taken in conjunction with the accompanying drawings.

DETAILED DESCRIPTION

Figure 1:
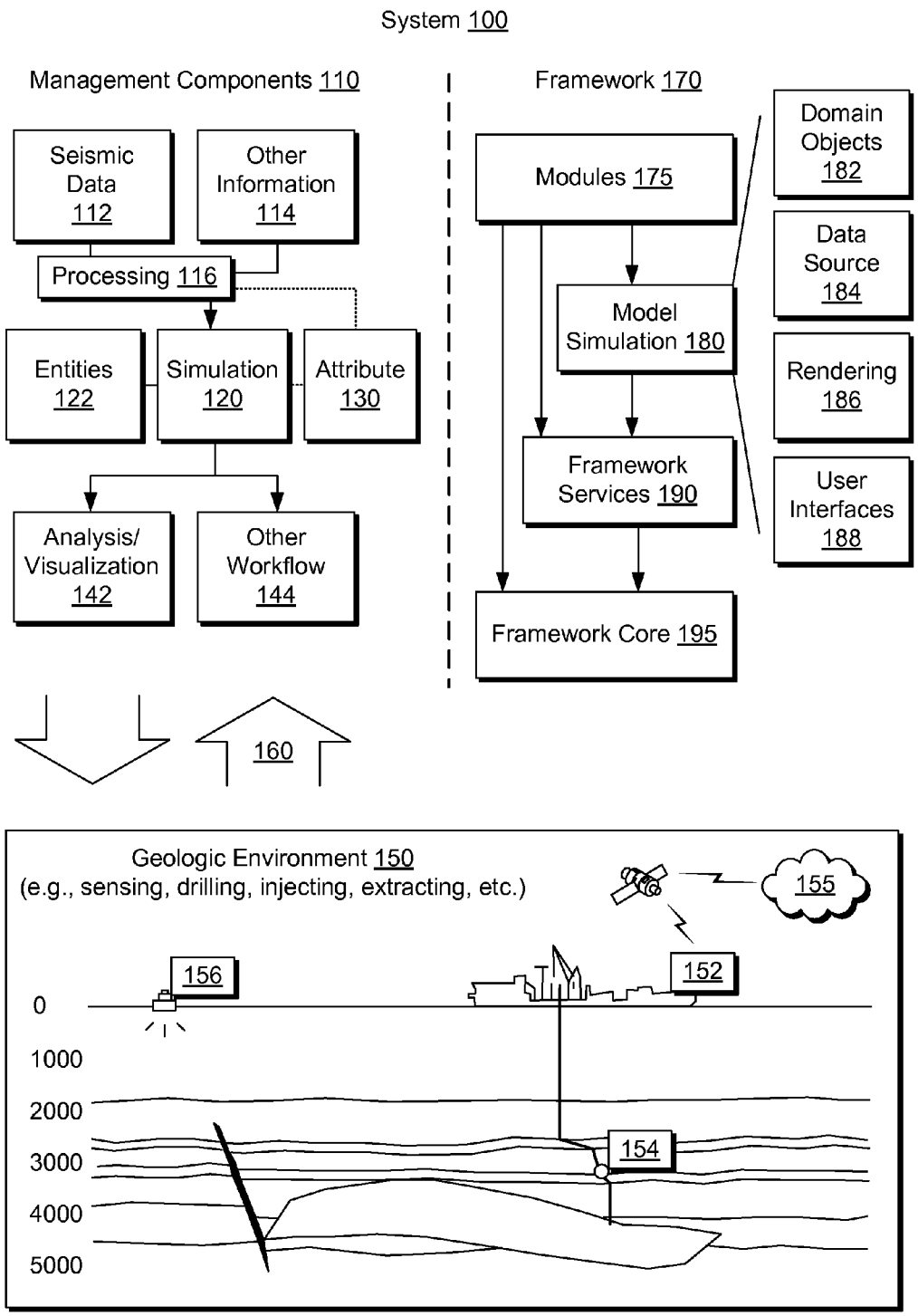
FIG. 1 illustrates an example system that includes various components for simulating a geological environment.

The following description includes the best mode presently contemplated for practicing the described implementations. This description is not to be taken in a limiting sense, but rather is made merely for the purpose of describing the general principles of the implementations. The scope of the described implementations should be ascertained with reference to the issued claims.

Phenomena associated with a sedimentary basin (e.g., a subsurface region, whether below a ground surface, water surface, etc.) may be modeled using various equations (e.g., stress, fluid flow, phase, etc.). For application of a numerical technique, such equations may be discretized using a grid that includes nodes, cells, etc. For example, a numerical technique such as the finite difference method can include discretizing a 1D differential heat equation for temperature with respect to a spatial coordinate to approximate temperature derivatives (e.g., first order, second order, etc.). Where time is of interest, a derivative of temperature with respect to time may also be provided. As to the spatial coordinate, the numerical technique may rely on a spatial grid that includes various nodes where a temperature will be provided for each node upon solving the heat equation (e.g., subject to boundary conditions, generation terms, etc.). Such an example may apply to multiple dimensions in space (e.g., where discretization is applied to the multiple dimensions).

As another example of a numerical technique, consider the finite element method where space may be represented by one dimensional or multi-dimensional "elements". For one spatial dimension, an element may be represented by two nodes positioned along a spatial coordinate. For multiple spatial dimensions, an element may include any number of nodes. Further, some equations may be represented by all nodes while others are represented by fewer than all nodes (e.g., consider an example for the Navier-Stokes equations where fewer than all nodes represent pressure). The finite element method may include providing nodes that can define triangular elements (e.g., tetrahedra in 3D, higher order simplexes in multidimensional spaces, etc.) or quadrilateral elements (e.g., hexahedra or pyramids in 3D, etc.), or polygonal elements (e.g., prisms in 3D, etc.). Such elements, as defined by corresponding nodes of a grid, may be referred to as grid cells.

Yet another example of a numerical technique is the finite volume method. For the finite volume method, values for model equation variables may be calculated at discrete places on a grid, for example, a node of the grid that includes a "finite volume" surrounding it. The finite volume method may apply the divergence theorem for evaluation of fluxes at surfaces of each finite volume such that flux entering a given finite volume equals that leaving to one or more adjacent finite volumes (e.g., to adhere to conservation laws). For the finite volume method, nodes of a grid may define grid cells.

Another approach to modeling of a sedimentary basin includes a pillar grid composed of nodes, pillars and cells. For example, in three-dimensions, eight nodes may define a cell, which may be referred to as a grid cell (e.g., a pillar grid cell). In a pillar grid model, grid cells may be indexed in an indexical domain using indexes i, j, and k (e.g., an indexical coordinate system). For example, a cubic grid cell (i.e., defined by eight corner nodes) may be indexed at its shallowest lower left corner and the number of grid cells may be a product of the model's i, j and k dimensions. In such an example, each grid cell may be defined by its eight nodes, which may be labeled according to height and compass directions (e.g., basesouthwest, topsouthwest, basenorthwest, topnorthwest, etc.). Pillar grids can model, for example, faults (e.g., a surface that cuts a pillar grid), horizons (e.g., "k" index), zones (e.g., volume between two horizons), segments (e.g., contiguous block of grid cells bounded by fault planes), etc., and may be used to specify properties (e.g., earth properties).

Where a sedimentary basin (e.g., subsurface region) includes various types of features (e.g., stratigraphic layers, faults, etc.), nodes, cells, etc., a grid may represent, or be assigned to, such features. In turn, discretized equations may better represent the sedimentary basin and its features.

In various examples, a depositional space or a depositional domain is mentioned. For a sedimentary basin, a depositional domain may be characterized, for example, as a domain: (i) where isochrons (conformable horizons) identified within a geological domain tend to be planar and parallel, (ii) where each point of the depositional domain located inside a stratigraphic sequence includes one corresponding location in a later-day geological domain (e.g., a present-day space), and (iii) where geometry of a geological domain tends to be physically relevant (e.g., representative of actual physical features).

As to a stratigraphic sequence, a sedimentary basin may include sedimentary deposits grouped into stratigraphic units, for example, based on any of a variety of factors, to approximate or represent time lines that place stratigraphy in a chronostratigraphic framework. While sequence stratigraphy is mentioned, lithostratigraphy may be applied, for example, based on similarity of lithology of rock units (e.g., rather than time-related factors).

As an example, a method can include: providing, in a geological domain coordinate system, a conformal mesh, conformal geological discontinuities and optionally to stratigraphic units of a geological model, where the conformal mesh includes depositional domain coordinates associated with a depositional domain coordinate system; providing, in the depositional domain coordinate system, an initial, at least vertically structured, multidimensional grid that includes initial nodes that define grid cells; referencing the conformal mesh to identify a set of grid cells traversed by the geological discontinuities; splitting each of the grid cells in the set to form sub cells, each of the sub cells defined at least in part by one or more new nodes; and assigning geological domain coordinates associated with the geological domain coordinate system to at least the new nodes to generate a final grid that includes the initial nodes, the new nodes and geological domain coordinates associated with the geological domain. Where the initial nodes have not been so assigned, such assigning may assign geological domain coordinates associated with the geological domain coordinate system to the new nodes and the initial nodes; otherwise, assigning may be for new nodes (e.g., initial nodes already assigned).

As an example, a grid may conform to structural features like y-faults, x-faults, low-angle unconformities, salt bodies, intrusions, etc. (e.g., geological discontinuities), to more fully capture complexity of a geological model. As an example, a grid may optionally conform to stratigraphy (e.g., in addition to one or more geological discontinuities). As to geological discontinuities, these may include model discontinuities such as one or more model boundaries. As an example, a grid may be populated with property fields generated, for example, by geostatistical methods. As an example, a grid may be mostly structured (e.g., may include some small unstructured portions), which can ease computations demands, enhance accuracy, etc. (e.g., for model-based simulations).

As mentioned, a grid may be built with respect to a depositional domain. As an example, a depositional domain may be a three-dimensional computational space defined by three depositional coordinates (u, v, w), which may be stored on nodes of a mesh representing a geological domain (e.g., specified in a Cartesian coordinate system with coordinates x, y, z). Such a mesh may be referred to as a background mesh. A background mesh can include the property of being conformal to geological discontinuities and optionally conformal to stratigraphy or optionally conformal to both stratigraphy and geological discontinuities (e.g., faults, unconformities, intrusions, model boundaries, etc.). As an example, distribution of depositional coordinates in a background mesh is such that when mapped to a depositional domain coordinate system (e.g., u, v, w), the geological domain is unfaulted and unfolded (e.g., all post-depositional deformations having altered material therein has been removed).

As an example, a method for building a grid can include: (1) generating an initial, at least vertically structured (e.g., "sugar cube", or other type of grid, etc.) grid covering a depositional domain (e.g., optionally an entire depositional domain of a model); (2) identifying grid cells that are traversed by geological discontinuities (e.g., in the initial grid) and splitting each of these grid cells into several polyhedral sub cells (e.g., for three-dimensional domains); (3) removing grid cells lying outside of model boundaries; and (4) associating geological domain coordinates (e.g., x, y, z) to nodes of the grid. Where initial nodes may already be associated, the new nodes may be associated whereas if the initial nodes have not been associated, then the new nodes and the initial nodes may be associated.

FIG. 1 shows an example of a system 100 that includes various management components 110 to manage various aspects of a geologic environment 150 (e.g., an environment that includes a sedimentary basin). For example, the management components 110 may allow for direct or indirect management of sensing, drilling, injecting, extracting, etc., with respect to the geologic environment 150. In turn, further information about the geologic environment 150 may become available as feedback 160 (e.g., optionally as input to one or more of the management components 110).

In the example of FIG. 1, the management components 110 include a seismic data component 112, an additional information component 114 (e.g., well/logging data), a processing component 116, a simulation component 120, an attribute component 130, an analysis/visualization component 142 and a workflow component 144. In operation, seismic data and other information provided per the components 112 and 114 may be input to the simulation component 120.

In an example embodiment, the simulation component 120 may rely on entities 122. Entities 122 may include earth entities or geological objects such as wells, surfaces, reservoirs, etc. In the system 100, the entities 122 can include virtual representations of actual physical entities that are reconstructed for purposes of simulation. The entities 122 may include entities based on data acquired via sensing, observation, etc. (e.g., the seismic data 112 and other information 114).

In an example embodiment, the simulation component 120 may rely on a software framework such as an object-based framework. In such a framework, entities may include entities based on pre-defined classes to facilitate modeling and simulation. A commercially available example of an object-based framework is the MICROSOFT® .NET™ framework (Redmond, Wash.), which provides a set of extensible object classes. In the .NET™ framework, an object class encapsulates a module of reusable code and associated data structures. Object classes can be used to instantiate object instances for use in by a program, script, etc. For example, borehole classes may define objects for representing boreholes based on well data.

In the example of FIG. 1, the simulation component 120 may process information to conform to one or more attributes specified by the attribute component 130, which may include a library of attributes. Such processing may occur prior to input to the simulation component 120. Alternatively, or in addition, the simulation component 120 may perform operations on input information based on one or more attributes specified by the attribute component 130. In an example embodiment, the simulation component 120 may construct one or more models of the geologic environment 150, which may be relied on to simulate behavior of the geologic environment 150 (e.g., responsive to one or more acts, whether natural or artificial). In the example of FIG. 1, the analysis/visualization component 142 may allow for interaction with a model or model-based results. Additionally, or alternatively, output from the simulation component 120 may be input to one or more other workflows, as indicated by a workflow component 144.

In an example embodiment, the management components 110 may include features of a commercially available simulation framework such as the PETREL® seismic to simulation software framework (Schlumberger Limited, Houston, Tex.). The PETREL® framework provides components that allow for optimization of exploration and development operations. The PETREL® framework includes seismic to simulation software components that can output information for use in increasing reservoir performance, for example, by improving asset team productivity. Through use of such a framework, various professionals (e.g., geophysicists, geologists, and reservoir engineers) can develop collaborative workflows and integrate operations to streamline processes. Such a framework may be considered an application and may be considered a data-driven application (e.g., where data is input for purposes of simulating a geologic environment).

In an example embodiment, various aspects of the management components 110 may include add-ons or plug-ins that operate according to specifications of a framework environment. For example, a commercially available framework environment marketed as the OCEAN® framework environment (Schlumberger Limited, Houston, Tex.) allows for seamless integration of add-ons (or plug-ins) into a PETREL® framework workflow. The OCEAN® framework environment leverages .NET® tools (Microsoft Corporation, Redmond, Wash.) and offers stable, user-friendly interfaces for efficient development. In an example embodiment, various components may be implemented as add-ons (or plug-ins) that conform to and operate according to specifications of a framework environment (e.g., according to application programming interface (API) specifications, etc.).

FIG. 1 also shows an example of a framework 170 that includes a model simulation layer 180 along with a framework services layer 190, a framework core layer 195 and a modules layer 175. The framework 170 may include the commercially available OCEAN® framework where the model simulation layer 180 is the commercially available PETREL® model-centric software package that hosts OCEAN® framework applications. In an example embodiment, the PETREL®software may be considered a data-driven application. The PETREL® software can include a framework for model building and visualization. Such a model may include one or more grids.

The model simulation layer 180 may provide domain objects 182, act as a data source 184, provide for rendering 186 and provide for various user interfaces 188. Rendering 186 may provide a graphical environment in which applications can display their data while the user interfaces 188 may provide a common look and feel for application user interface components.

In the example of FIG. 1, the domain objects 182 can include entity objects, property objects and optionally other objects. Entity objects may be used to geometrically represent wells, surfaces, reservoirs, etc., while property objects may be used to provide property values as well as data versions and display parameters. For example, an entity object may represent a well where a property object provides log information as well as version information and display information (e.g., to display the well as part of a model).

In the example of FIG. 1, data may be stored in one or more data sources (or data stores, generally physical data storage devices), which may be at the same or different physical sites and accessible via one or more networks. The model simulation layer 180 may be configured to model projects. As such, a particular project may be stored where stored project information may include inputs, models, results and cases. Thus, upon completion of a modeling session, a user may store a project. At a later time, the project can be accessed and restored using the model simulation layer 180, which can recreate instances of the relevant domain objects.

In the example of FIG. 1, the geologic environment 150 may be outfitted with any of a variety of sensors, detectors, actuators, etc. For example, equipment 152 may include communication circuitry to receive and to transmit information with respect to one or more networks 155. Such information may include information associated with downhole equipment 154, which may be equipment to acquire information, to assist with resource recovery, etc. Other equipment 156 may be located remote from a well site and include sensing, detecting, emitting or other circuitry. Such equipment may include storage and communication circuitry to store and to communicate data, instructions, etc.

Figure 2:
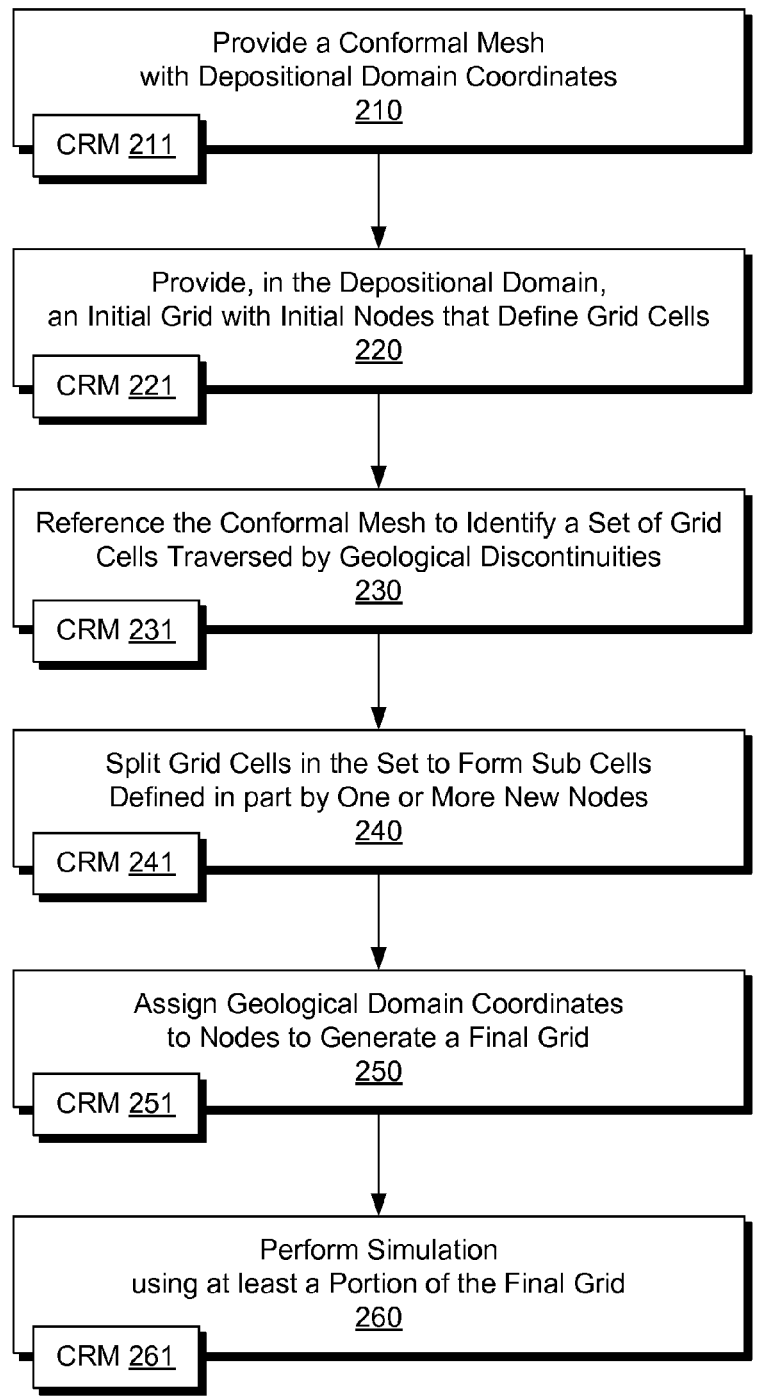
FIG. 2 illustrates an example of a method.

FIG. 2 shows an example of a method 200 for performing a simulation of one or more phenomena associated with a geologic environment. In the example of FIG. 2, the method 200 includes: a provision block 210 for providing a conformal mesh with depositional domain coordinates; a provision block 220 for providing, in the depositional domain, an initial grid with initial nodes that define grid cells (e.g., at least vertically structured); a reference block 230 for referencing the conformal mesh to identify a set of grid cells traversed by geological discontinuities (e.g., which may include one or more boundaries of a model); a splitting block 240 for splitting grid cells in the set to form sub cells where each of the sub cells may be defined at least in part by one or more new nodes; an assignment block 250 for assigning geological domain coordinates to at least the new nodes to generate a final grid (e.g., that includes the initial nodes, the new nodes and geological domain coordinates associated with the geological domain); and a performance block 260 for performing a simulation of phenomena associated with a geologic environment using at least a portion of the final grid. As to performing a simulation, such a simulation may include interpolating geological rock types, interpolating petrophysical properties, simulating fluid flow, or other calculating (e.g., or a combination of any of the foregoing).

As to using at least a portion of a final grid, as an example, consider a flow simulation performed for a portion of a final grid "surrounding" a geological discontinuity such as a fault (e.g., or a side of a fault, etc.). In such an example, the portion of the final grid would include some of the initial nodes of the initial grid and some new nodes that resulted from splitting to form sub cells.

The method 200 is shown in FIG. 2 in association with various computer-readable media (CRM) blocks 211, 221, 231, 241, 251 and 261. Such blocks generally include instructions suitable for execution by one or more processors (or cores) to instruct a computing device or system to perform one or more actions. While various blocks are shown, a single medium may be configured with instructions to allow for, at least in part, performance of various actions of the method 200. As an example, a computer-readable medium (CRM) may be a computer-readable storage medium.

In an example embodiment, a method can include: providing, in a geological domain coordinate system, a conformal mesh, conformal to geological discontinuities of a geological model (e.g., and optionally to stratigraphic units of a geological model), that includes depositional domain coordinates associated with a depositional domain coordinate system (see, e.g., blocks 210 and 211); providing, in the depositional domain coordinate system, an initial, at least vertically structured, multidimensional grid that includes initial nodes that define grid cells (see, e.g., blocks 220 and 221); referencing the conformal mesh to identify a set of grid cells traversed by the geological discontinuities (see, e.g., blocks 230 and 231); splitting each of the grid cells in the set to form sub cells, each of the sub cells defined at least in part by one or more new nodes (see, e.g., blocks 240 and 241); and assigning geological domain coordinates associated with the geological domain coordinate system to at least the new nodes (see, e.g., blocks 250 and 251), for example, to generate a final grid that includes the initial nodes, the new nodes and geological domain coordinates associated with the geological domain. Where the initial nodes have not been so assigned, such assigning may assign geological domain coordinates associated with the geological domain coordinate system to the new nodes and the initial nodes; otherwise, assigning may be for new nodes (e.g., initial nodes already assigned).

In the foregoing example, providing a conformal mesh may include providing an unstructured conformal mesh, an irregular conformal mesh, or an unstructured and irregular conformal mesh. As an example, providing an initial, at least vertically structured, multidimensional grid can include providing a structured multidimensional grid aligned with the conformable horizons in the depositional domain.

As an example, splitting grid cells, in a set of grid cells, into sub cells can include splitting each of the grid cells in the set to form unstructured sub cells. For an example with three dimensions in space, splitting can include splitting each of the grid cells in the set to form sub cells shaped as polyhedra.

In various examples, a conformal mesh can include tetrahedra, which may be space filling within a domain. As an example, nodes of an at least vertically structured multidimensional grid may define hexahedral grid cells.

As to splitting, as an example, splitting may include computing an intersection between a line of a conformal mesh that represents a geological discontinuity and a line of a grid cell. In such an example, the line may be a line in two dimensions or a line in three dimensions. As another example, splitting may include computing an intersection between a plane of a conformal mesh that represents a geological discontinuity and a plane of a grid cell (e.g., in a three dimensional domain).

As an example, one or more computer-readable storage media can include computer-executable instructions to instruct a computing device to: access a conformal mesh, conformal to geological discontinuities of a geological model (e.g., and optionally to stratigraphic units of a geological model), that includes depositional domain coordinates associated with a depositional domain coordinate system (see, e.g., block 211); access an initial, at least vertically structured, multidimensional grid that includes initial nodes that define grid cells and that include depositional domain coordinates associated with the depositional domain coordinate system (see, e.g., block 221); reference the conformal mesh to identify a set of grid cells of the initial grid traversed by the geological discontinuities (see, e.g., block 231); split each of the grid cells in the set to form sub cells, each of the sub cells defined at least in part by one or more new nodes (see, e.g., block 241); and assign geological domain coordinates associated with the geological domain coordinate system to at least the new nodes (see, e.g., block 251), for example, to generate a final grid that includes the initial nodes, the new nodes and geological domain coordinates associated with the geological domain.

As an example, one or more computer-readable storage media can include computer-executable instructions to instruct a computing device to: access a grid that includes unstructured portions, the unstructured portions defined at least in part by unstructured nodes that conform to a mesh defined with respect to a depositional domain for a geological model; assign properties to the grid; and perform a simulation using the grid to simulate phenomena that depends at least in part on the assigned properties. As an example, instructions may be provided to instruct a computing device to discretize equations that describe the phenomena with respect to a grid (e.g., an accessed grid). As an example, grid nodes may be associated with coordinates of a coordinate system for a depositional domain and associated with coordinates of a coordinate system for a geological domain. As an example, instructions may be provided to instruct a computing device to form a grid by splitting cuboid grid cells of an initial grid using a conformal mesh (e.g., by referencing the mesh to identify a set of grid cells of the initial grid traversed by geological discontinuities represented by the mesh).

Figure 3:
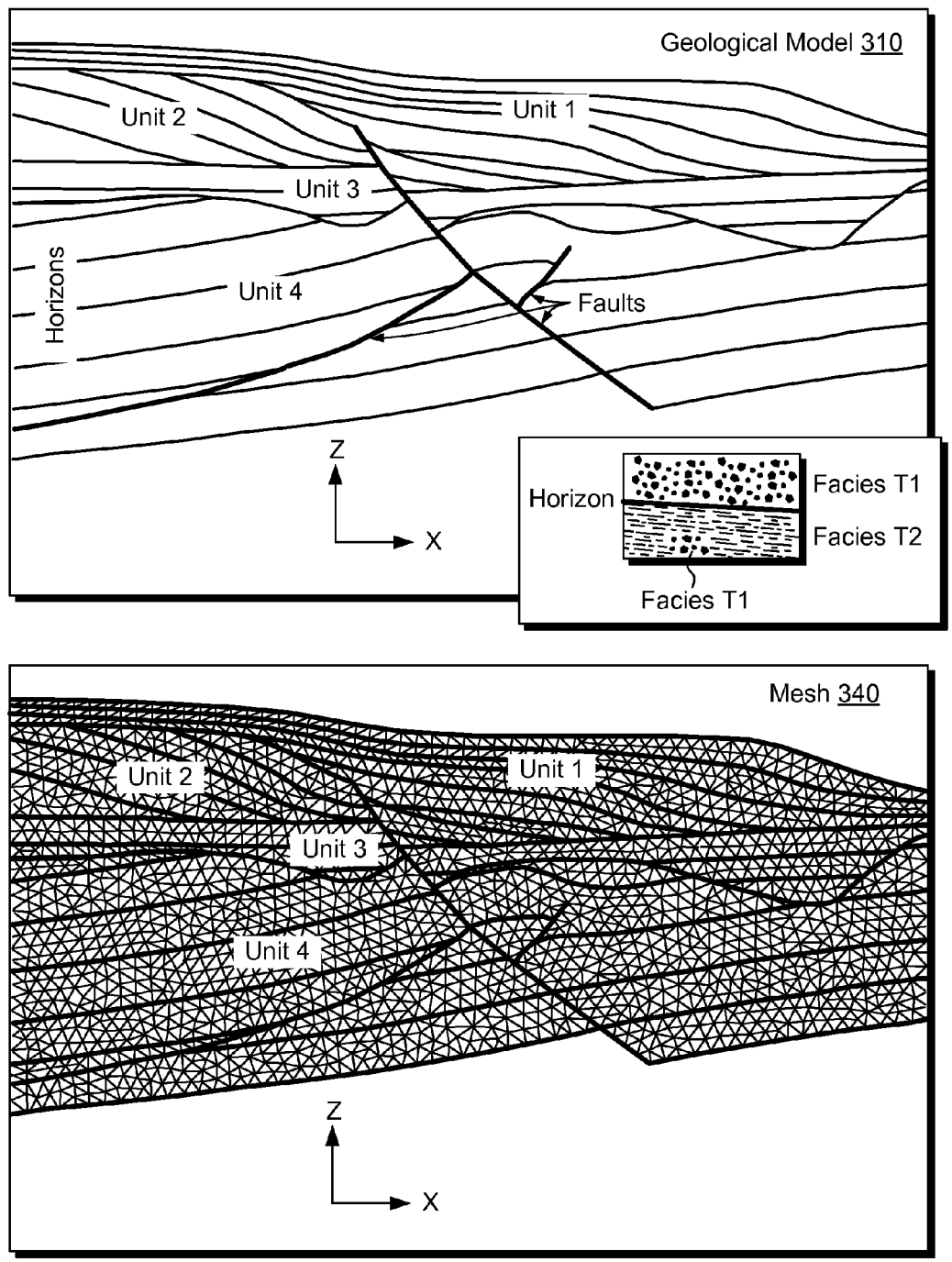
FIG. 3 illustrates an example of a geological model and an example of a mesh in a geological domain.

FIG. 3 shows an example of a geological model 310 and an example of a corresponding mesh 340. In the example of FIG. 3, the geological model 310 and the mesh 340 are shown with respect to two dimensions (Z, X) of a geological domain coordinate system. The geological model 310 includes various features such as horizons, faults and fades (e.g., type 1, type 2, etc.). Further, the geological model 310 includes four different stratigraphic units. In the example of FIG. 3, the mesh 340 conforms to various features of the geological model 310 via a tessellated field of triangles where each triangle is defined by three nodes of the mesh 340. For example, legs of triangles lie along the boundaries of the various faults, legs of triangles lie along the boundaries of the various horizons, etc. Thus, the mesh 340 may be referred to as a conformal mesh (e.g., it conforms to faults, stratigraphic units, horizons, unconformities, model boundaries of the geological model 310, etc.).

In general, a relationship exists between node spacing and phenomenon or phenomena being modeled. Various scales may exist within a geologic environment, for example, a molecular scale may be on the order of $10^{-9}$ to $10^{-8}$ meters, a pore scale may be on the order of $10^{-6}$ to $10^{-3}$ meters, bulk continuum may be on the order of $10^{-3}$ to $10^{-2}$ meters, and a basin scale on the order of $10^3$ to $10^5$ meters. As an example, nodes of a mesh may be selected based at least in part on the type of phenomenon or phenomena being modeled (e.g., to select nodes of appropriate spacing or spacings).

Some data may be involved in building an initial geological model and a corresponding mesh and, thereafter, a model and a corresponding mesh may optionally be updated in response to model output, changes in time, physical phenomena, additional data, etc. Data may include one or more of the following: depth or thickness maps and fault geometries and timing from seismic, remote-sensing, electromagnetic, gravity, outcrop and well log data. Furthermore, data may include depth and thickness maps stemming from facies variations (e.g., due to seismic unconformities) assumed to following geological events ("iso" times) and data may include lateral facies variations (e.g., due to lateral variation in sedimentation characteristics).

Figure 4:
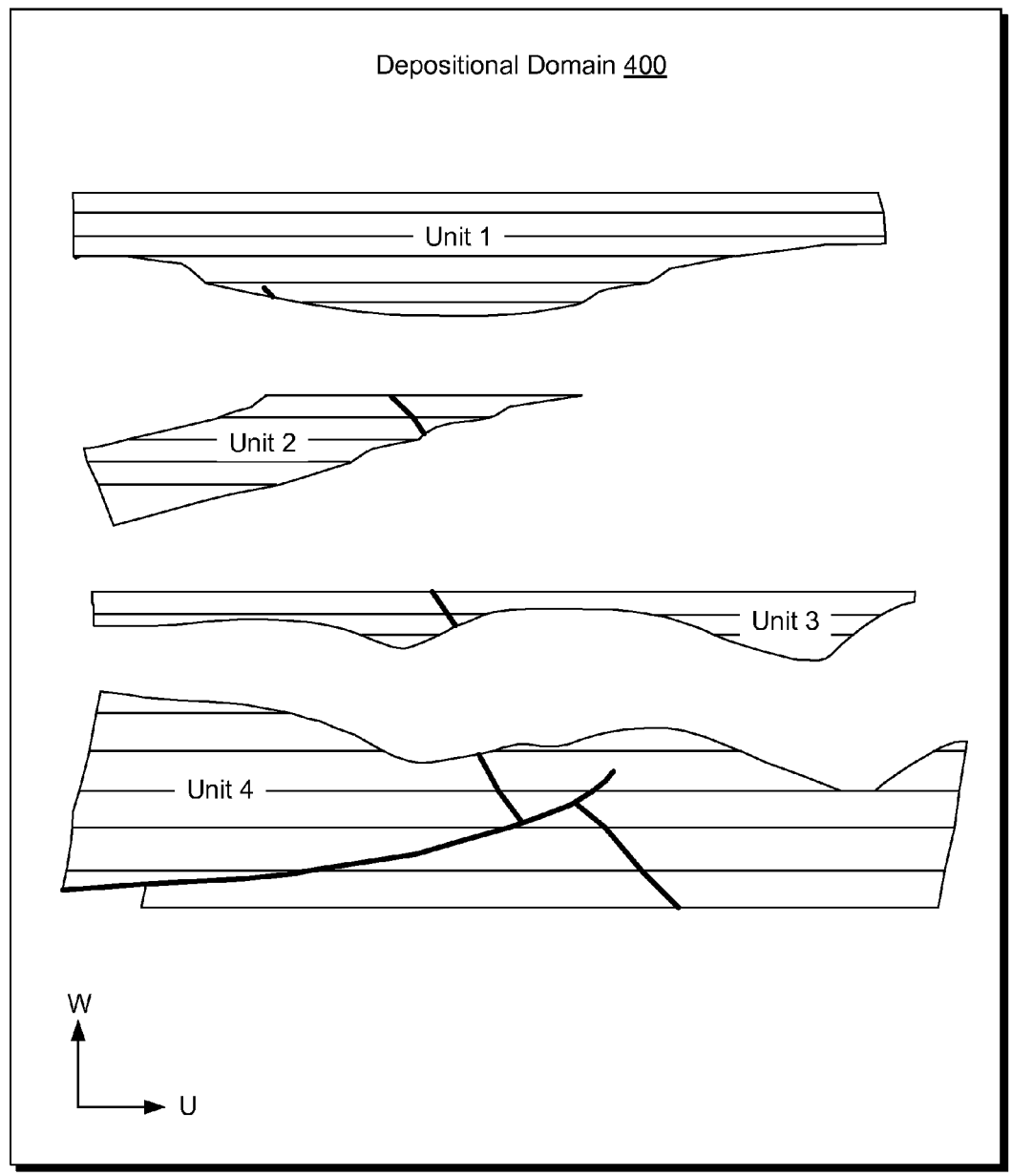
FIG. 4 illustrates an example of stratigraphic units in a depositional domain.

FIG. 4 shows an example of a depositional domain 400 that includes the four stratigraphic units of FIG. 3. In the example of FIG. 4, the four stratigraphic units are shown with respect to two dimensions (W, U) of a coordinate system for the depositional domain. As shown, in each of the stratigraphic units, horizons align with the U coordinate (e.g., as mentioned, a depositional domain may be characterized as including isochrons that tend to be planar and parallel). Thus, the four stratigraphic units in the depositional domain 400 include horizons that are unfolded and unfaulted (see, e.g., horizontal lines intersecting thick lines that may represent discontinuities). As to an initial grid, it may align with conformable horizons and optionally with one or more stratigraphic units (e.g., depending on one or more limits of a stratigraphic unit). As to limits of a stratigraphic unit, as shown in the example of FIG. 4, each of the units includes at least one "limit" that does not conform to an "isochron". For example, a limit or limits of a stratigraphic unit may be an unconformal or an "unconformity" (e.g., erosions, baselaps, discontinuities, etc.), for example, it may correspond to a gap in a geological record. Again, as shown in the units of FIGS. 3 and 4, such particular "horizons" are not flat in the depositional domain (see, e.g., upper portion of Unit 4).

Given some examples of a geological model in a geological domain, a conformal mesh in a geological domain and stratigraphic units in a depositional domain, various examples of aspects of building a grid are described.

As an example, given a depositional domain, an initial, at least vertically structured grid may be created that covers at least a portion of the depositional domain. For example, the initial at least vertically structured grid may cover a portion of the depositional domain that includes one or more stratigraphic units. To create the initial at least vertically structured grid, a mesh defined by nodes in a geological domain may be provided that includes depositional domain coordinates associated with each of the nodes. For example, for the mesh 340 of FIG. 3, each of the nodes in the geological domain may include or otherwise be associated with coordinates for the depositional domain 400 of FIG. 4. Thus, in such an example, a mapping may occur for a node of the mesh 340 to a position in the depositional domain 400. As the mesh 340 is a conformal mesh, the stratigraphic units and geological discontinuities of the geological model 310 may be mapped to the depositional domain 400. Accordingly, the mesh 340 may serve as a reference for features that exist in the geological model 310. As an example, a mesh, a grid, nodes, grid cells, etc., may be represented by one or more data structures populated with various information (e.g., coordinates of one or more coordinate systems, etc.). As an example, such a data structure may be stored in a data store (e.g., a data storage device).

Figure 5:
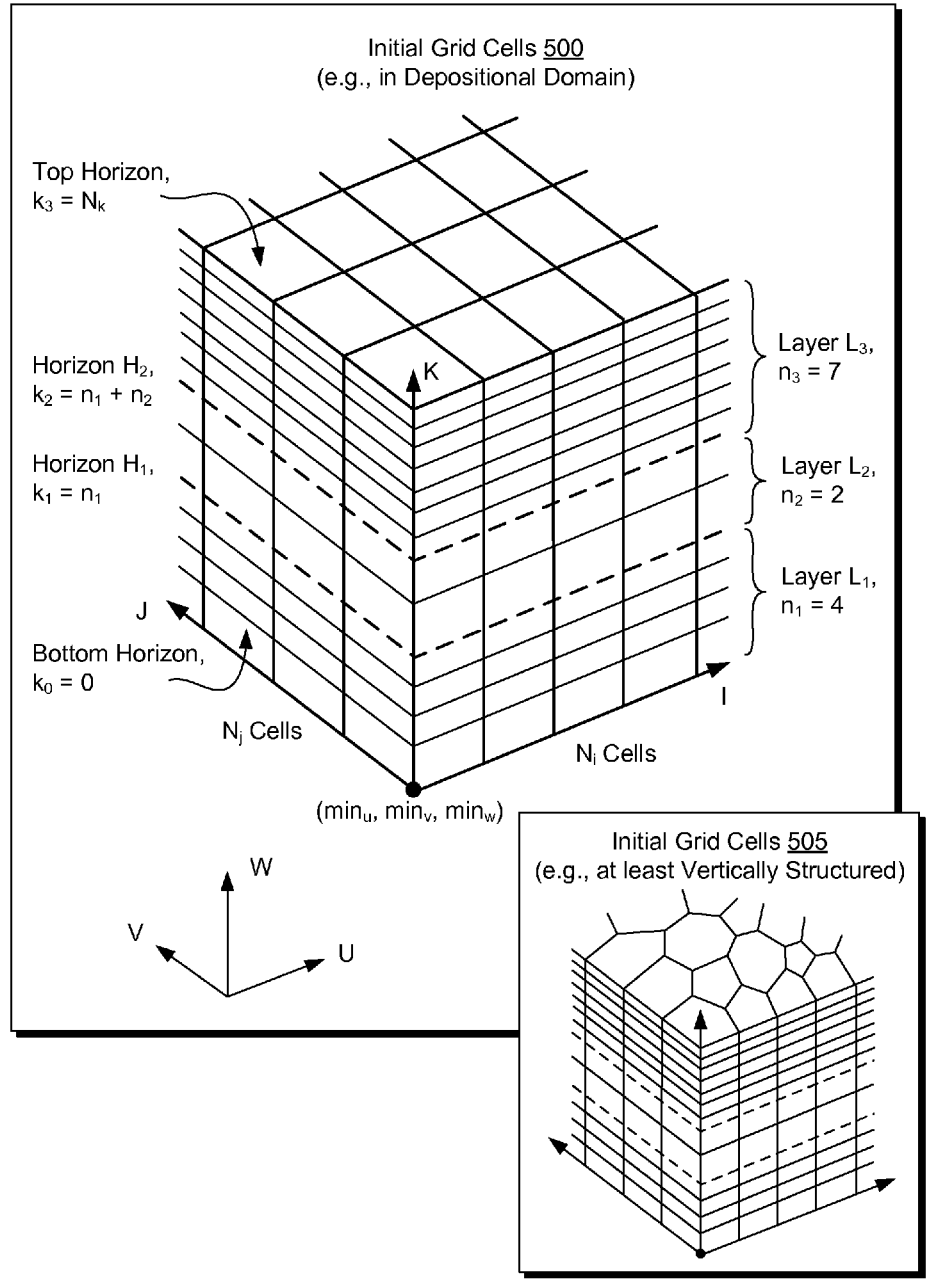
FIG. 5 illustrates examples of initial grid cells in a depositional domain.

FIG. 5 shows an example of initial grid cells 500 in a three dimensional depositional domain (U, V, W) and an example of other initial grid cells 505 in a three dimensional depositional domain (e.g., U, V, W). In both of these examples, the initial grid cells are defined by an initial grid that is at least vertically structured (e.g., vertically and horizontally structured 500 or vertically structured 505). As an example, in the three spatial dimensions, to create an initial at least vertically structured grid, it is possible to loop over nodes of a conformal mesh (e.g., on which depositional coordinates are stored), and to record minimum and maximum values of each of the depositional domain coordinates (e.g., for U, V and W: $min_u$, $min_v$, $min_w$, $max_u$, $max_v$ and $max_w$, respectively).

As an example, in the three-dimensional depositional domain (U, V, W) eight points defined as $(min_u, min_v, min_w)$, $(max_u, min_v, min_w)$, $(max_u, max_v, min_w)$, $(min_u, max_v, min_w)$, $(min_u, min_v, max_w)$, $(max_u, min_v, max_w)$, $(max_u, max_v, max_w)$, and $(min_u, max_v, max_w)$ define a cuboid in which a produced grid may fit (e.g., that includes grid cells and optionally sub cells). Assuming a grid is defined by i, j, k indices in an indexical coordinate system (I, J, K) and that a number of grid cells in each of the indexical coordinate system directions I, J and K are known as $N_i$, $N_j$ and $N_k$, respectively, then former points may be respectively associated with grid nodes with indices (0, 0, 0), $(N_i, 0, 0)$, $(N_i, N_j, 0)$, $(0, N_j, 0)$, $(0, 0, N_k)$, $(N_i, 0, N_k)$, $(N_i, N_j, N_k)$, and $(0, N_j, N_k)$. In such an example, the I and J directions align with the U and V directions, respectively; noting that as a general case, I and J directions may be oriented in any of a variety of orientations in a depositional domain. To facilitate grid building, however, the K direction of the indexical coordinate system may be aligned with the W direction of the depositional domain coordinate system (e.g., as a height or depth dimension as in a pillar grid).

As shown in the example of FIG. 5, for the initial grid cells 500, where the K direction is oriented vertically, a k value may be assigned to each horizon identified between the top ($k=N_k$ by convention) and the bottom ($k=0$ by convention) of a geological model. Such a k value, "$k_i$", depends of a number of grid cells $n_i$ for each layer $L_i$ of a model (e.g., which may be assumed to be known): $k_i$=sum (j=1 to i) $n_j$. The w coordinates attached to the k values may be known where they correspond to horizons in the depositional domain (see, e.g., example horizons in the deposition domain 400 of FIG. 4). For w coordinates attached to remaining k values, these may be computed using, for example, a linear interpolation inside a layer to which they belong. As to u and v coordinates of grid nodes, these may be computed as follows for examples where grid geometry is regular with respect to their directions: u(i, j, k)=$min_u$+i(($max_u$−$min_u$)/$N_i$), and v(i, j, k)=$min_v$+j(($max_v$−$min_v$)/$N_j$). In the examples of FIG. 5, the depositional geometry of an at least vertically structured grid may be defined where grid nodes may optionally include consistent depositional coordinates (u, v, w). As shown in the example of FIG. 5, the initial grid cells 500 may be regular cuboids that may be specified according to grid cell indices (e.g., in the indexical coordinate system I, J, K). In the example of FIG. 5, the initial grid cells 505 may include shapes other than regular cuboids (e.g., where they are at least vertically structured).

Referring again to the method of FIG. 2, the initial grid cells 500 of FIG. 5 (e.g., or the initial grid cells 505) may correspond to the provision block 220 that provides a grid in the depositional domain that includes nodes that define grid cells. In the example of FIG. 5, the initial grid cells 500, as well as the nodes that define these cells, are structured and horizons (e.g., iso-w, as in the example of FIG. 4) are assigned to specific k coordinates according to a number of layers (e.g., three layers) and a number of desired cells in each of the layers (e.g., 4, 2, and 7, respectively). In the example of FIG. 5, the grid of the initial grid cells 500 is regular in the I and J directions, which are aligned respectively with the U and V directions, noting again that these axes of the grid may have another orientation in a depositional domain.

Figure 6:
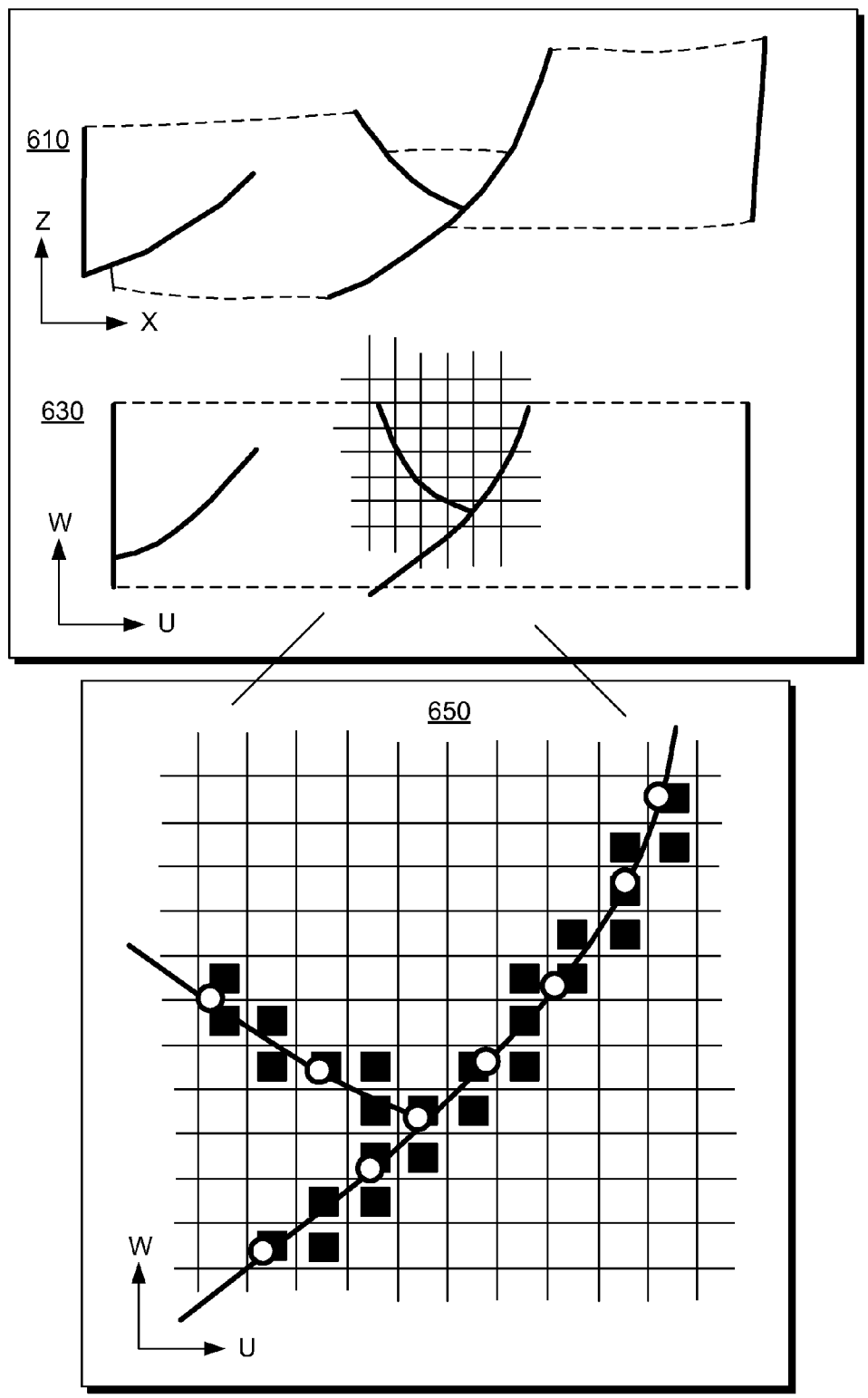
FIG. 6 illustrates an example of geological discontinuities in two domains and an example of grid cells in a depositional domain traversed by geological discontinuities.

FIG. 6 shows an example of geological discontinuities in a geological domain 610, corresponding geological discontinuities in a depositional domain 630 and an enlarged view of grid cells traversed by at least one of the geological discontinuities 650. The example of FIG. 6 is shown with respect to two dimensions of a geological domain (Z, X) and two dimensions of a depositional domain (W, U). The enlarged view of grid cells traversed by at least one of the geological discontinuities 650 identifies grid cells using block boxes to indicate that an interior or a border at least partially intersects a geological discontinuity represented by a thick black line. As mentioned with respect to the method 200 of FIG. 2 (see, e.g., reference block 230) a conformal mesh may be referenced to identify a set of grid cells traversed by one or more geological discontinuities (e.g., faults, unconformities, intrusions, model boundaries, etc.).

As mentioned, a three-dimensional geological domain (e.g., X, Y, Z) may be represented by a three-dimensional mesh with depositional coordinates (u, v, w) defined on nodes of the mesh. Such a mesh may be composed of arbitrary shapes defined by its nodes (e.g., structured or/and unstructured, regular or/and irregular) and, where conformal, such a mesh honors at least one geological discontinuity (e.g., some of its nodes, shape faces, etc., locally approximate geometry of a geological discontinuity).

As indicated in the example of FIG. 6, a grid cell is identified as to be traversed by a geological discontinuity if its border or its interior at least partially intersects one mesh feature (e.g., node, line, shape, face, etc.) representing the geological discontinuity. For example, where the mesh includes tetrahedra defined by nodes, a fault may be represented by faces of some of the tetrahedra. Where one of these faces intersects a grid cell, that grid cell may be identified as belong to a set of grid cells that are traversed by one or more geological discontinuities.

As an example, a geometrical test may be applied for identification of one or more grid cells. As an example, such a test may optionally be reduced to a box/triangle intersection test (e.g., depending on "shapes" involved). As an example, if faces defined by nodes of a mesh representing one or more geological discontinuities are shaped as polygons, each of the faces may be subdivided into an equivalent connex set of triangles.

Figure 7:
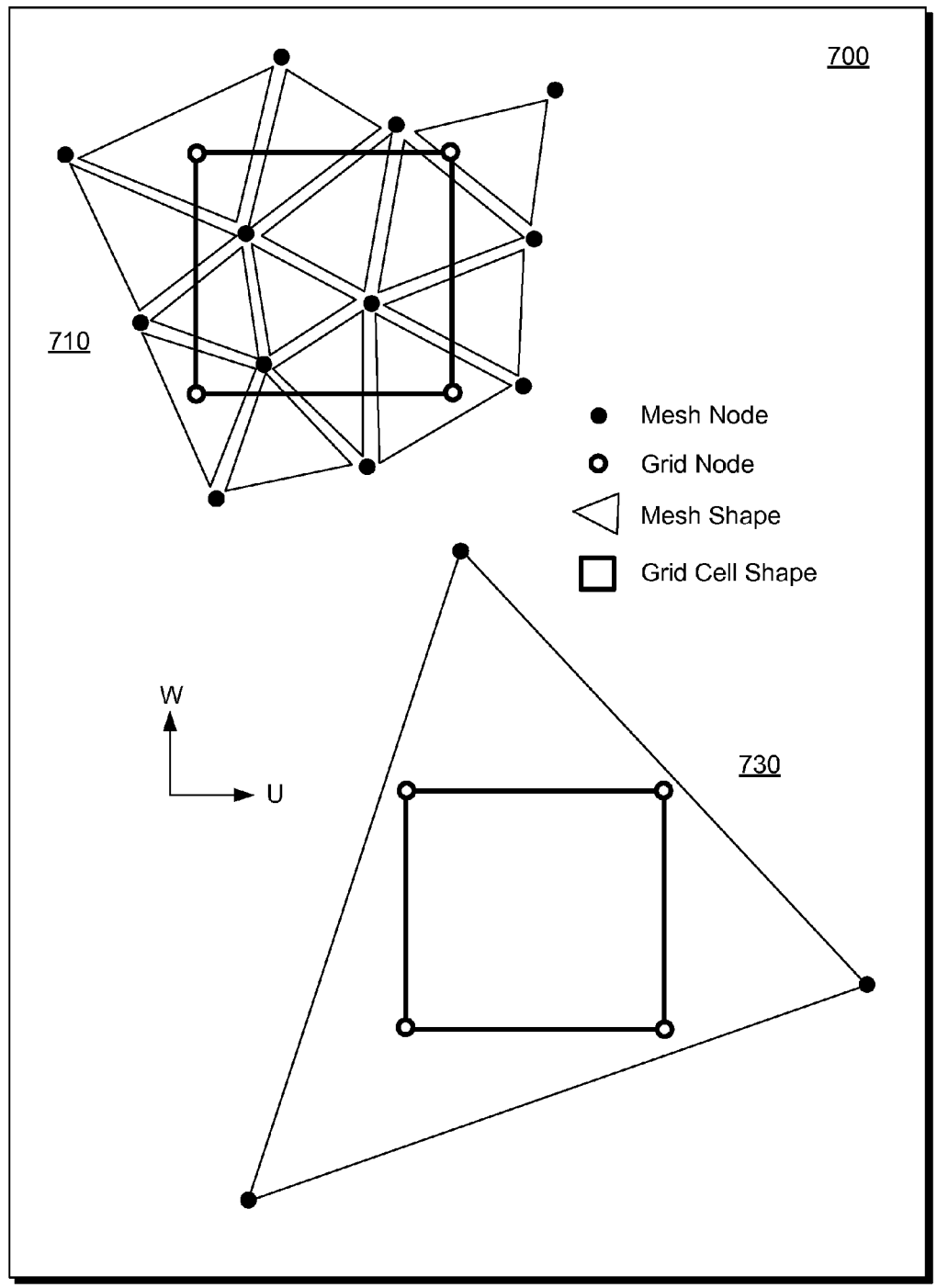
FIG. 7 illustrates examples of grid cells with respect to conformal meshes in a depositional domain.

FIG. 7 shows examples 710 and 730 of grid cells with respect to a portion of a mesh in a depositional coordinate system 700 where the portion represents a geological discontinuity. A legend in FIG. 7 includes solid circles for mesh nodes, open circles for grid nodes, solid line triangles as mesh shapes, and thick solid line boxes as grid cell shapes. In the example 710, a grid cell defined by grid nodes is shown with respect to various mesh shapes defined by mesh nodes where shapes intersect the border of the grid cell or are included within the border of the grid cell. The mesh nodes that define the shapes may form a set (e.g., a set of mesh nodes, a set of mesh shapes, etc.) that are relevant to a grid cell. In the example 730, a grid cell defined by grid nodes is shown with respect to a mesh shape defined by mesh nodes where the grid cell lies within the mesh shape. The mesh nodes that define the shape may form a set (e.g., a set of mesh nodes) or be a shape that is relevant to a grid cell. In the example 710 and the example 730, the grid cell would be identified as belonging to a set of grid cells traversed by a geological discontinuity represented by the mesh (e.g., mesh nodes, mesh shapes, etc.). Further, for a grid cell so identified as being traversed by a geological discontinuity, a corresponding set of mesh nodes (e.g., or mesh shapes) will exist for that grid cell. Thus, for a set of grid cells, each grid cell in the set will be associated with at least some mesh nodes (e.g., or mesh shapes).

Figure 8:
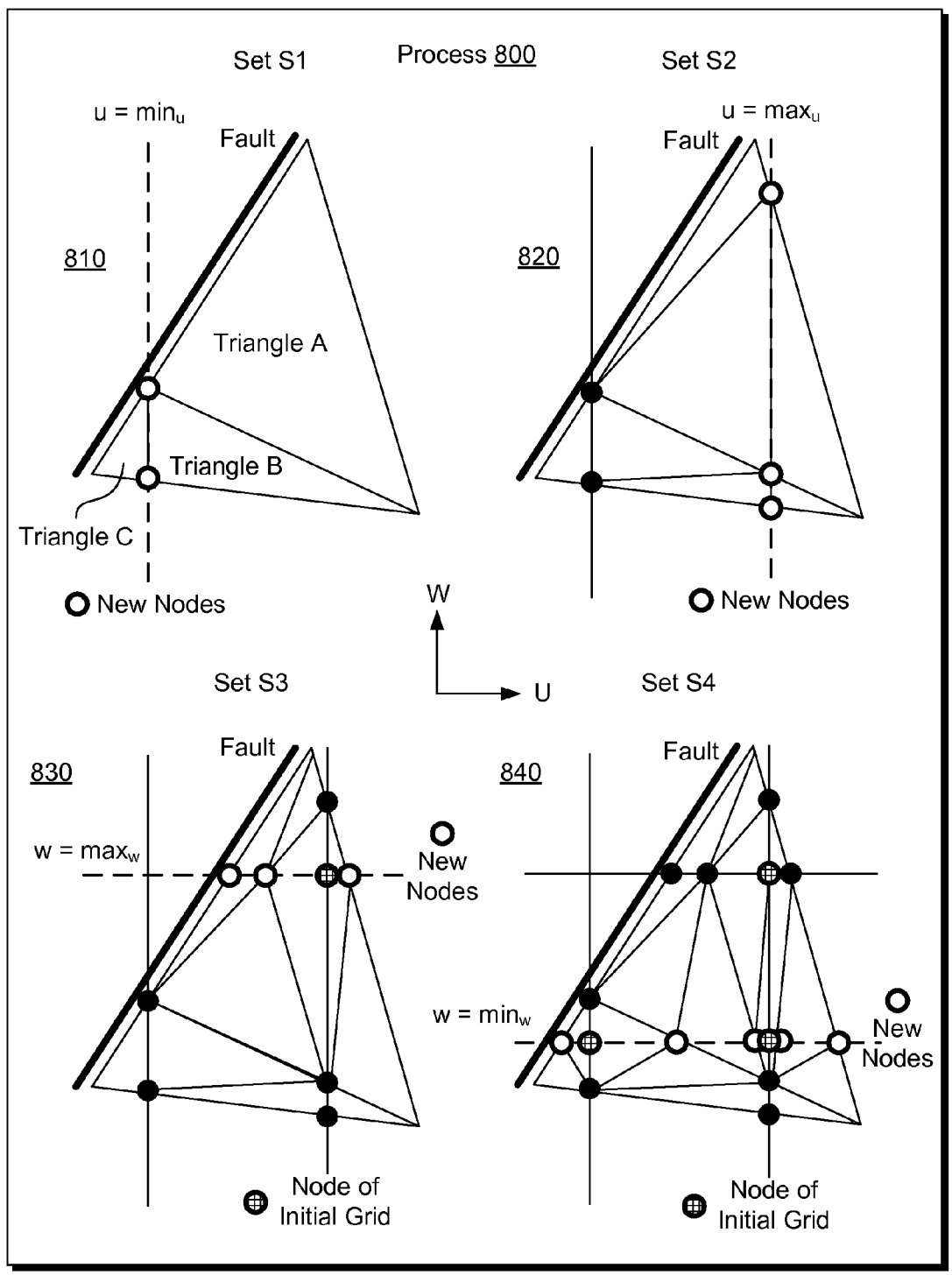
FIG. 8 illustrates an example of forming new nodes in a depositional domain by intersecting a conformal mesh and a grid cell.

The example of FIG. 8 shows an example of a process 800 as to how a mesh shape or shapes defined by mesh nodes may be split by lines or planes defining a grid cell. The process 800 may be part of a process for splitting a grid cell given a mesh that identifies the grid cell as being traversed by a geological discontinuity. In the process 800, a set of mesh nodes or one or more mesh shapes (e.g., optionally a set of mesh shapes) may be associated with a grid cell.

In the example of FIG. 8, the process 800 can include defining new nodes and identifying nodes that may be nodes of an initial grid. For example, where an initial grid includes initial nodes that define grid cells, an intersection may be identified as being a node that corresponds to an existing initial node of the initial grid. As explained, a process can split a grid cell of an initial grid to form a sub cell where the sub cell may be defined by one or more new nodes that do not belong to the initial nodes. Such a sub cell may include a combination of one or more new nodes and one or more initial nodes.

For the example of FIG. 8, a mesh shape is shown (e.g., a triangle) as including a line or a surface that represents a fault (e.g., a geological discontinuity). In such an example, the mesh shape may be represented by three or more mesh nodes (e.g., it may be a single mesh shape or a set of mesh shapes associated with a grid cell).

In the process 800, for a face of a grid cell in a depositional coordinate system W, U (e.g., which may further include a coordinate for a third dimension), four intersecting actions 810, 820, 830, and 840 are performed. The order of the actions 810, 820, 830 and 840 may be performed in any particular order. The action 810 includes intersecting the mesh shape with an edge of a grid cell at a value $u=\min_u$. As shown, the edge intersects the mesh shape at two points (see open circles), which may be deemed new nodes, whether permanent or temporary (e.g., ultimately not part of a sub cell formed by grid cell splitting). Given these intersection points, two triangles may be formed (e.g., in two dimensions) by drawing one line from one of the intersection points to a node of the mesh shape (e.g., to form triangles A and B) and by drawing another line between the two intersection points (e.g., to form triangle C from triangle B). In the example of FIG. 8, the triangles A, B and C are members of a set of triangles S1.

The action 820 includes intersecting the mesh shape and its set of triangles S1 with another edge of the grid cell at a value $u=\max_u$. The action 820 includes forming a set of triangles S2 (e.g., including seven triangles). Further, the action 820 includes defining three new nodes, which may be permanent or temporary. The action 830 includes intersecting the mesh shape and its set of triangles S2 with another edge of the grid cell at a value $w=\max_w$. The action 830 includes forming a set of triangles S3 (e.g., including 13 triangles). As the action 830 occurs after the action 820, one of the intersections corresponds to a node of the initial grid. Thus, the action 830 identifies a node of the initial grid as well as defines three new nodes (e.g., which may be permanent or temporary). The action 840 includes intersecting the mesh shape and its set of triangles S3 with another edge of the grid cell at a value w=min$_v$. The action 840 includes forming a set of triangles S4 (e.g., including 23 triangles). The action 840 also identifies two nodes of the initial grid, along with five new nodes, which may be permanent or temporary. The process 800 for the actions 810, 820, 830 and 840 covers two dimensions. For a three-dimensional process, additional sets would be formed, for example, for tetrahedra (e.g., S5 and S6). For example, where the third dimension is "V" (e.g., U, V, and W, as in the example of initial grid cells 500 of FIG. 5), an action for v=min$_v$ and an action for v=max$_v$ may be performed. Further, each of the actions may involve intersecting using planes (e.g., planes that define boundaries of a three-dimensional grid cell). In a three-dimensional example, the fault (e.g., geological discontinuity) may be a plane that intersects a three dimensional grid cell defined by maximum and minimum values for u, v and w in a (U, V, W) coordinate system.

As mentioned, the process 800 may be part of a process for splitting a grid cell. For example, in the method 200 of FIG. 2, the splitting block 240 may include a process such as the process 800 (e.g., for two or three-dimensions). The resulting set S4 or other resulting set (e.g., S6) from such a process may be provided for purposes of splitting a grid cell into sub cells, for example, with respect to a geological discontinuity such as the fault of the example of FIG. 8.

Figure 9:
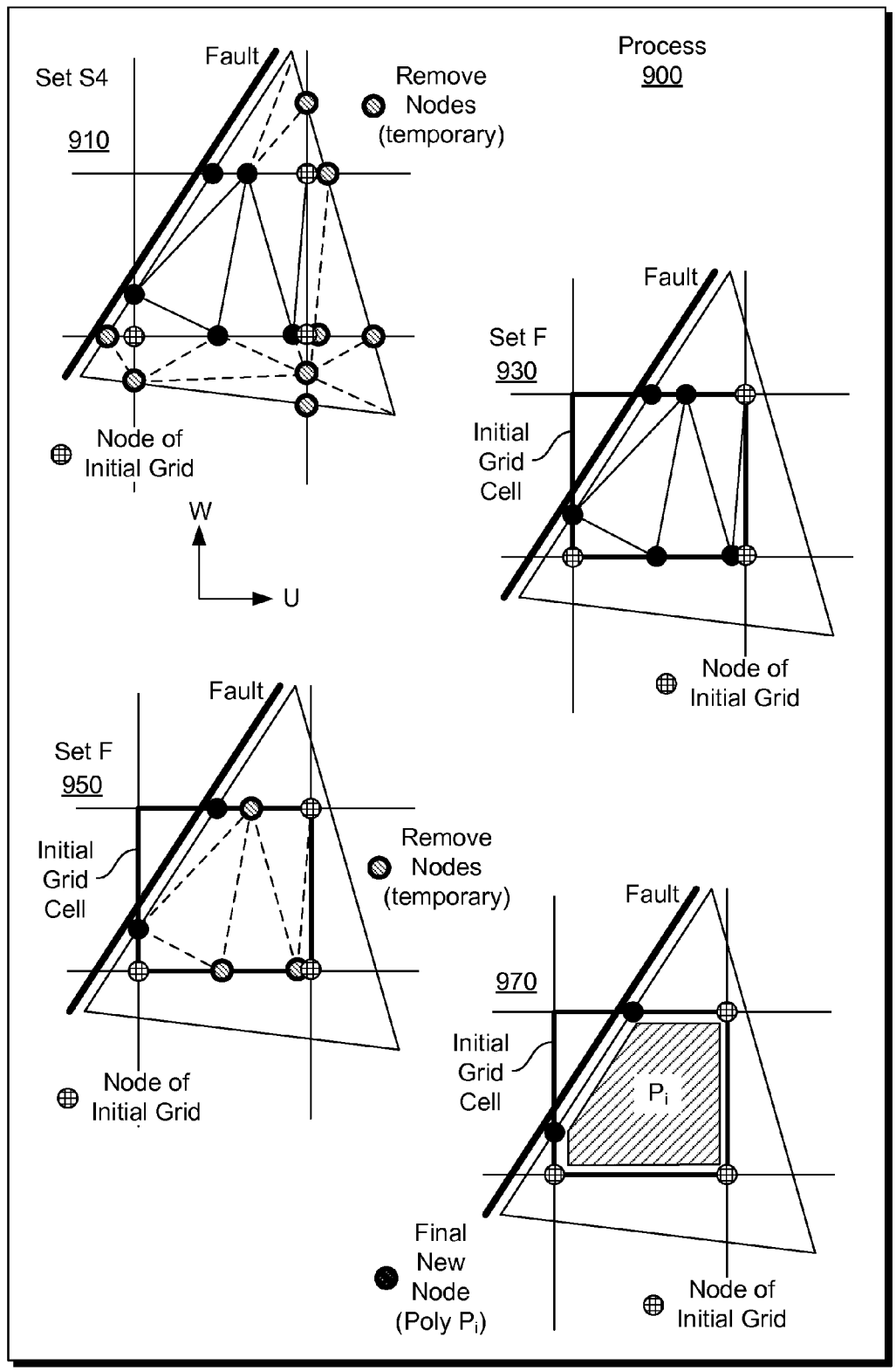
FIG. 9 illustrates an example of forming a sub cell for a grid cell in a depositional domain where the sub cell is defined, at least in part, by one or more new nodes.

As to the intersection points resulting from actions 810, 820, 830 and 840, one or more of these intersection points may become a permanent new node (e.g., a final new node) for a grid upon splitting a grid cell into sub cells; one or more others may be temporary. As an example, a process 900 pertaining to new nodes is described with respect to FIG. 9. As shown in FIG. 9, the process 900 may provide for a sub cell that includes at least one new node (e.g., a permanent or final new node) and optionally one or more nodes that are initial nodes from an initial grid.

Prior to providing a detailed description of the process 900 of FIG. 9, as described in the examples of FIGS. 5, 6, 7 and 8, a grid cell to be split may be defined by (i, j, k) coordinates (see, e.g., FIG. 5) and mesh nodes, shapes, etc., may form a set due to being included in a corresponding (u, v, w) box of the grid cell or by intersecting the grid cell's borders (see, e.g., FIGS. 6 and 7). Given such a set, a splitting process may commence that aims to split the grid cell into sub cells where such a process includes first forming a set of triangles, tetrahedra, etc., from the set of mesh nodes, shapes, etc. (see, e.g., FIG. 8). Thus, a first set may be a set of mesh nodes, shapes, etc. while a second set may be set of nodes, shapes, etc., (e.g., including or defined by new nodes) formed at least in part by intersecting the grid cell and the first set.

As an example, consider forming a first set of mesh nodes or mesh shapes "S" using a geometrical test (e.g., a box/tetrahedron intersection test). Where shapes of a mesh (e.g., a conformal mesh) are made by general polyhedra, these polyhedra may be subdivided into equivalent connex sets of tetrahedra (see, e.g., FIG. 8 for a process in two dimensions).

For a three-dimensional depositional domain (U, V, W) with u, v, and w coordinates, consider the u coordinate where an identified grid cell can be associated with a depositional domain coordinate range delta$_u$, equal to [u(i, j, k), u(i+1, j+1, k+1)]. Each mesh shape (e.g., tetrahedra or other shape) of a set S is then cut by a plane defined by u=min(delta$_u$), creating new tetrahedra gathered in a new set S1 (see, e.g., the action 810 of FIG. 8 for a two-dimensional representation). Next, each tetrahedron of the new set S1 may be cut by a plane defined by u=max(delta$_u$), creating new tetrahedra gathered in another new set S2 (see, e.g., the action 820 of FIG. 8 for a two-dimensional representation).

After completing actions with respect to the u coordinate, the v coordinate may be considered where tetrahedra of set S2 are in turn cut by a plane defined by v=min(delta$_v$), with delta$_v$ equal to [v(i, j, k), v(i+1, j+1, k+1)], creating new tetrahedra gathered in a new set S3. Each tetrahedron of the set S3 may then be cut by a plane defined by v=max(delta$_v$), creating a new set of tetrahedra S4. Finally, the w coordinate may be considered where the tetrahedra of the set S4 are in turn cut by a plane defined by w=min(delta$_w$), with delta$_w$ equal to [w(i, j, k), w(i+1, j+1, k+1)], creating new tetrahedra gathered in a new set S5. Next, each tetrahedron of the set S5 may be cut by a plane w=max(delta$_w$), creating a final set of tetrahedra S6 (see, e.g., the example of FIG. 8 where "w" corresponds to sets S3 and S4).

For a three-dimensional scenario, tetrahedra contained in a "final" set (e.g., set S6) can include properties such as: (a) they are by construction conformal to the geological discontinuities (e.g. properties inherited from a conformal mesh) and optionally conformal to stratigraphy of a geological model; and (b) they are also by construction conformal to the borders of the considered grid cell (e.g., from an at least vertically structured grid).

Given the foregoing three-dimensional examples and two-dimensional descriptions, the process 900 of FIG. 9 may be explained. FIG. 9 shows the process 900 as including four actions 910, 930, 950 and 970. For a two-dimensional scenario, the action 910 includes providing a final set S4 while, for a three-dimensional scenario, the action 910 may include providing a final set S6.

Given a final set (e.g., S4 or S6), the action 930 may be applied to remove all triangles of the set S4 or all tetrahedra (or other shapes) of the set S6 that have a barycenter lying outside a box corresponding to a current grid cell being split. In the example of FIG. 9, various nodes in the set S4 are labeled as having been identified for removal (e.g., along with any legs or surfaces as in a three-dimensional scenario). In the example of FIG. 9, as the set S4 includes some nodes identified as being those of an initial grid (e.g., initial grid cell nodes), it is possible that the process 900 may preserve these (e.g., one or more may form part of a sub cell).

In the example of FIG. 9, the action 930 produces a final set F of triangles, tetrahedra, etc. As shown in FIG. 9, the final set F is conformal to the geological discontinuities (e.g., and optionally conformal to stratigraphy) of a geological model. The foregoing property allows for further division into n several connex components $F_i$ (i=0 . . . n−1). The fourth action 970 of the process 900 provides for removing temporary nodes, for example, based on an envelope of each of the connex components $F_i$, which, as shown, can define a general polygon $P_i$, which in a three-dimensional scenario would be a general polyhedron $P_i$. In the example of FIG. 9, the sub cell (e.g., as represented by the polygon Pi) is defined at least in part by one new node and, more particularly, two new nodes (e.g., permanent or final nodes resulting from the processes 800 and 900). A final grid that defines the resulting sub cell includes initial nodes as well as new nodes. In such an example, initial nodes may be at least vertically structured (see, e.g., the nodes of initial grid for the action 970) whereas the new nodes may be unstructured (see, e.g., the final new nodes for the action 970).

For the three-dimensional scenario, faces of polyhedron either correspond to a boundary of the considered grid cell (e.g., which may correspond to a horizon) or to a geological discontinuity. As an example, even in situations where they may be unstructured, such polyhedra may be consistently associated with indices (e.g., i, j, k) of an indexical coordinate system of a considered initial grid cell. Such an association may facilitate, for example, populating properties in a produced final grid. As an example, a method may include simplifying geometry of polyhedra (e.g., without modifying their topology). As an example, a set of such polyhedra may define an unstructured portion of a produced grid.

Figure 10:
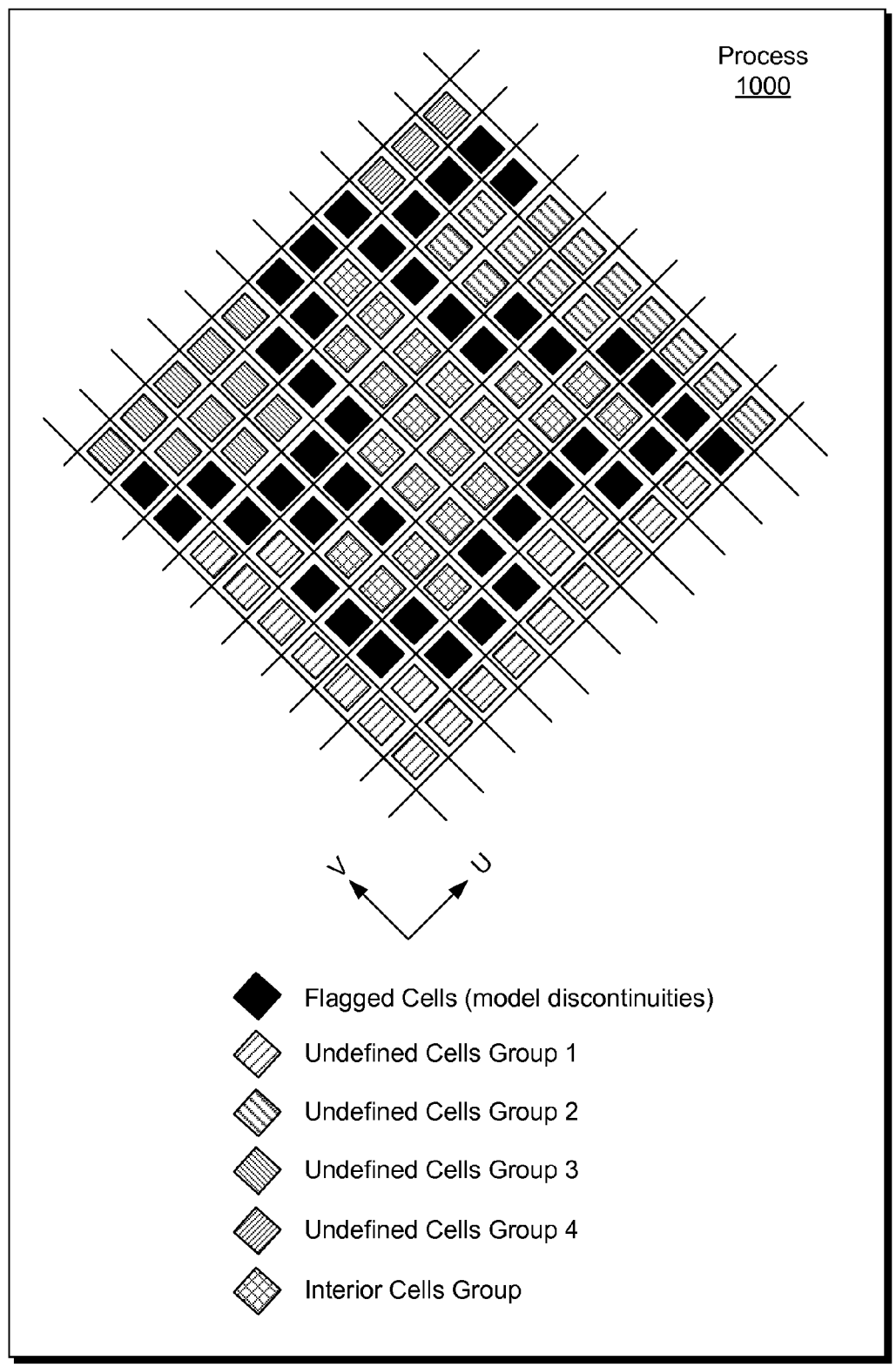
FIG. 10 illustrates an example of denoting types of grid cells.

FIG. 10 shows an example of a process 1000 for removing at least some produced grid cells, for example, because they lie outside of a model boundary. In the example of FIG. 10, the process 1000 includes flagging grid cells traversed by geological discontinuities (see, e.g., black boxes). The process 1000 then continues by examining at least some of the remaining grid cells, for example, by recursively scanning them by starting at a non-visited grid cell and proceeding to its neighbors (e.g., if is not flagged). Such a process can produce groups of connex unflagged grid cells. In such an example, each of these groups of grid cells may not be traversed by one or more geological discontinuities and thus may lie either entirely inside a geological model or entirely outside a geological model.

As an example, consider choosing a random representative grid cell for each group of grid cells and testing if its barycenter lies inside one of the shapes of a conformal mesh (e.g., a mesh conforming to geological discontinuities that include model boundaries and conforming to stratigraphy). If a barycenter does lie inside, this may mean that the considered group of grid cells lies entirely inside the geological model; if not, this may mean that the considered group of grid cells lies entirely outside the geological model, and, for example, all of its grid cells may be flagged as undefined.

As an example, a set of undefined grid cells may be further enlarged by considering flagged grid cells that are traversed by the geological model boundaries and not traversed by other types of geological discontinuities (e.g., not faults, unconformities or intrusions). In the example of FIG. 10, a graphic shows some sets of undefined grid cells in, for example, a top view of a depositional domain coordinate system (e.g., V, U).

Thus, the process 1000 is illustrated in FIG. 10 as an example where undefined cells can be identified in a grid. For example, grid cells traversed by one or more geological discontinuities may be flagged (e.g., black boxes) and at least some of the remaining grid cells recursively scanned, for example, starting with a non-visited grid cell and going to its neighbors (e.g., if is not flagged). In the example of FIG. 10, the process 1000 may produce five groups of connex unflagged grid cells (e.g., where one group is an interior group of grid cells).

Referring again to the example method 200 of FIG. 2, the assignment block 250 includes assigning geological domain coordinates to at least the new nodes that define, at least in part, sub cells of a split grid cell. Where many grid cells are split, such new nodes may be assigned geological domain coordinates. As mentioned, where initial nodes of an initial grid have not been previously assigned geological domain coordinates, an assignment block may assign such coordinates for both new nodes and initial nodes, for example, of a final grid. Where splitting to form sub cells occurs region-by-region, unit-by-unit, geological discontinuity-by-geological discontinuity, etc., assignment may occur upon formation of a sub cell or at another time. For example, splitting may occur to form sub cells for multiple stratigraphic units and, thereafter, all new nodes may be assigned geological domain coordinates. In such an example, where initial nodes were not previously assigned, new nodes and initial nodes may be assigned geological domain coordinates, for example, to provide a final grid.

As an example, an assignment process may include assigning or otherwise associating geological domain coordinates (e.g., x, y, z) to at least some of the grid nodes, including at least some of the new grid nodes that result from a splitting process that splits a grid cell into sub cells; noting that the splitting process was performed in a depositional domain (e.g., with depositional domain coordinate u, v, w).

As an example, an assignment process may distinguish two kinds of grid nodes: a first category of grid nodes made of initial (or original) grid nodes; and a second category of grid nodes made of grid nodes of an unstructured portion of the grid.

As to the first category, to find the respective (x, y, z) location for each node, it may be possible to first find the nodes or shapes of the conformal mesh that contain each grid node and to then compute a corresponding (x, y, z) location using an interpolation scheme, for example, between the (x, y, z) locations of mesh nodes. Such an interpolation scheme may optionally be reduced to a barycentric interpolation scheme. For example, if shapes of a conformal mesh are general polyhedra, these polyhedra may be subdivided into equivalent connex sets of tetrahedra.

As to the second category of grid nodes (e.g., grid nodes of an unstructured portion of the grid), as mentioned, in a three-dimensional scenario each of these grid nodes is located at an intersection between a tetrahedron's edge and an iso-u, iso-v or iso-w plane (e.g., in a depositional domain). As a consequence, the respective (x, y, z) location for each of the grid nodes of the second category may be computed, for example, using a linear interpolation between two (x, y, z) locations of nodes defining the edge.

Figure 11:
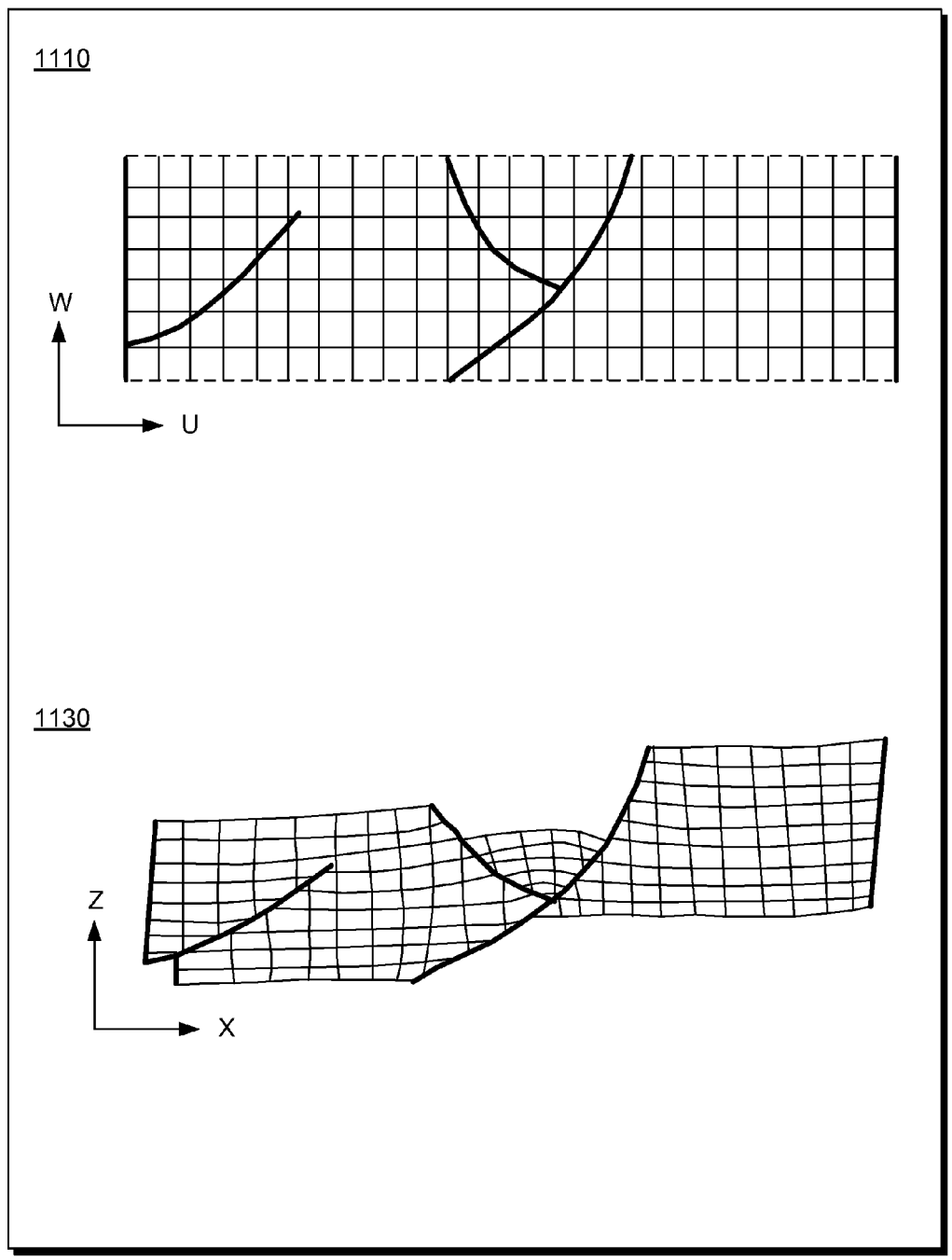
FIG. 11 illustrates an example of geological discontinuities of a geological model in a depositional domain and in a geological domain.

As an example, a final geometry of a grid may be defined with grid nodes having consistent coordinates (x, y, z). FIG. 11 shows examples of a final grid in a depositional domain 1110 (e.g., in a vertical cross-section view of W, U plane) and that final grid in a geological domain 1130 (e.g., in a vertical cross-section view of Z, X plane). In the examples of FIG. 11, the grid conforms to the horizons and to the discontinuities. Referring to the indexical coordinate system (I, J, K) and the depositional domain coordinate system (U, V, W), these can provide for grids that do not include, for example, gaps, interpenetrating areas or repeated grid cells. Such features can facilitate property population. As an example, a grid may include a proportion of unstructured grid cells that, in relationship to structured grid cells, is small.

Figure 12:
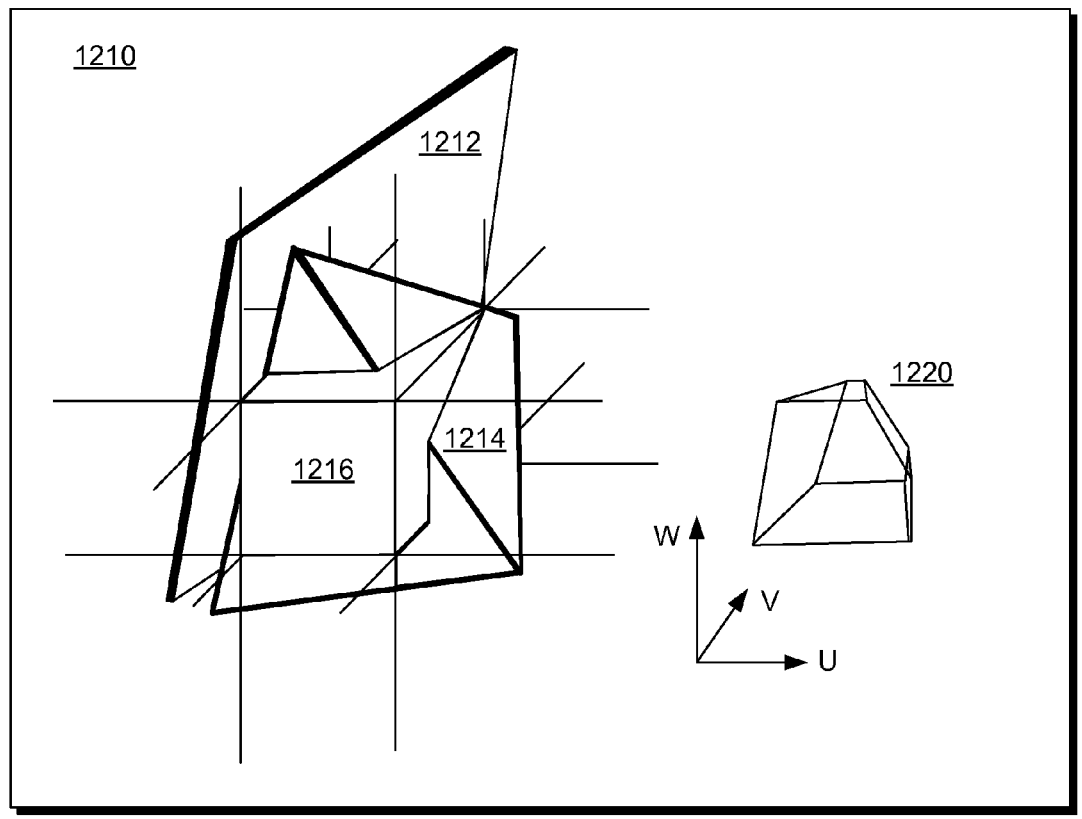
FIG. 12 illustrates an example of a three-dimensional mesh intersecting a three-dimensional grid cell in a depositional domain and an example of a three-dimensional geological model that includes geological discontinuities.
Figure 12:
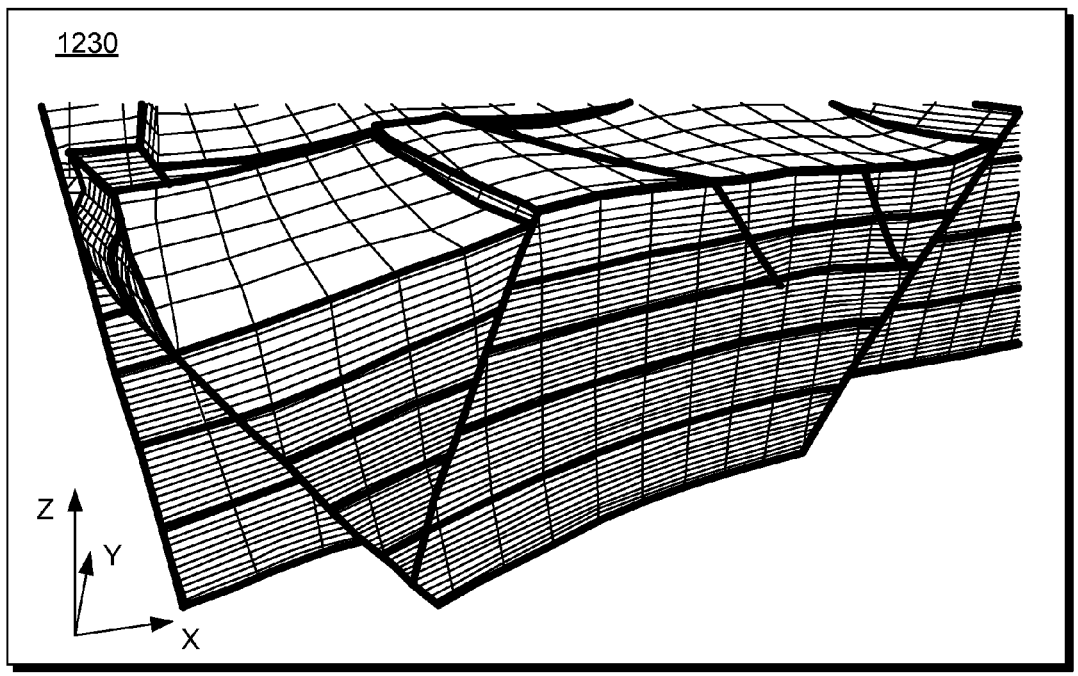

FIG. 12 shows an example of splitting a grid cell to a sub cell for a three-dimensional scenario 1210 along with a perspective view of a grid in a geological domain 1230. In the example of splitting 1210, a fault 1212 is illustrated as a plane along with a tetrahedron 1214 of a mesh (e.g., a conformal mesh and defined by nodes of the mesh) and a cuboid grid cell 1216, identified as being intersected by the tetrahedron 1214 of the mesh. To simplify the illustration of FIG. 12 for the example of splitting 1210, the shown tetrahedron 1214 is the sole tetrahedron that intersects the identified grid cell 1216. Note that multiple tetrahedra may intersect the identified grid cell 1216 (e.g., for a general case), forming a different polyhedron than the polyhedron 1220 as shown. Upon performing various actions, a polyhedron 1220 may be formed as a sub cell in the depositional domain (W, V, U). In the example of FIG. 12, the polyhedron 1220 is defined by at least some new nodes and such nodes may be associated with coordinates in the geological domain. In the example of FIG. 12, the fault 1212 may correspond to one of the faults shown in the grid of the geological domain 1230.

Figure 13:
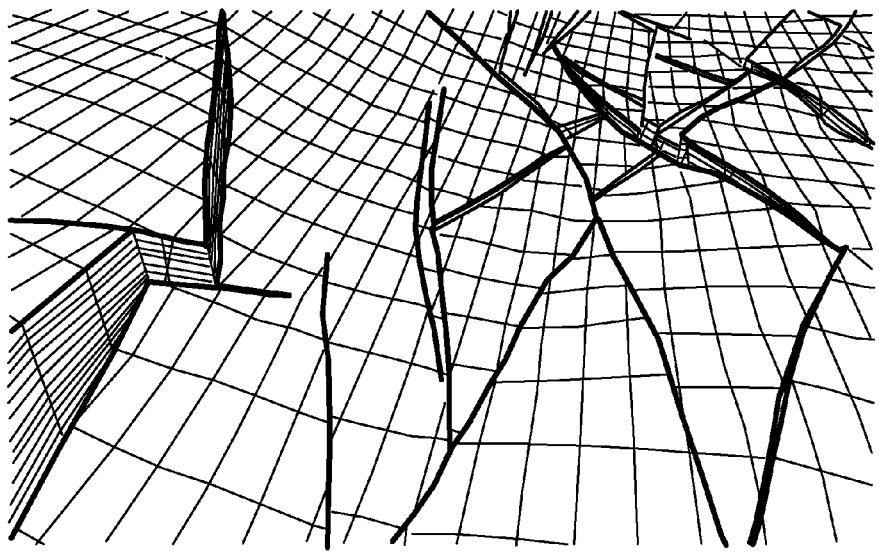
FIG. 13 illustrates examples of three-dimensional models.
Figure 13:
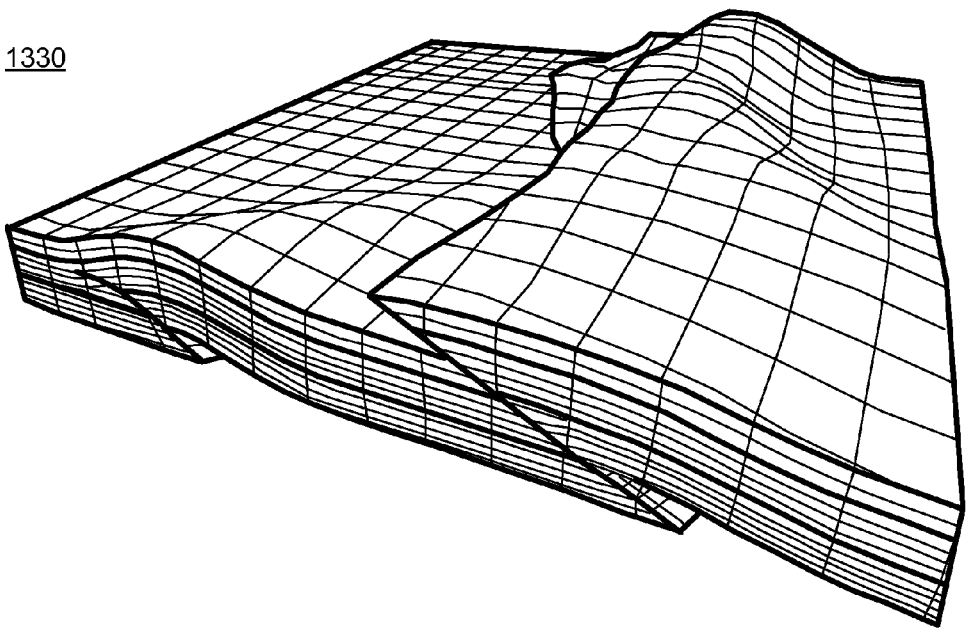

FIG. 13 shows perspective views of examples of grids in a geological domain 1310 and 1330. In each of these examples, the grids may include nodes generated from a grid cell splitting process in a depositional domain, for example, referencing a conformal mesh.

As an example, a grid construction process can make use of a mesh, and by such a process, a produced grid may conform to surfaces of the mesh. Such a mesh may be a conformal mesh that conforms to geological discontinuities of a geological model. A mesh may be irregular and unstructured, irregular and structured, etc. As an example, a mesh may include unstructured nodes, shapes, etc., as such an approach may add flexibility as to ability to conform to complex geometries of a geological model.

As an example, fault geometries, including fault branching relationships, may be taken into account in a grid construction process. As an example, complexity of a geological model can be taken into account in a grid construction process (e.g., including stratigraphy, unconformities, intrusions, etc.), optionally with a feature for adding small unstructured portions.

As an example, a grid may be initially generated in a depositional domain, which can provide that the grid follows at least some stratigraphy of a geological model. For example, as a depositional domain may be a suitable framework for running geostatistical algorithms and generating realistic property fields, a produced grid may be populated with such properties. As an example, a geostatistical algorithm or algorithms may be run on a grid (e.g., optionally before grid cells traversed by one or more geological discontinuities are split). As an example, a method may include populating one or more unstructured grid portions with suitable reservoir properties. As an example, grid cells, including the unstructured split ones, may have a consistent regular (i, j, k) indexation. Such a produced grid may be compatible with a flow simulator capable of handling lists of connectivities.

As an example, unstructured portions of a grid may be built by computing geometrical intersections between some volume shapes of a mesh and various planes of iso-depositional coordinates. As an example, a process may proceed even in the instance where some mesh shapes of a mesh overlap each other, for example, in a neighborhood of a fault or faults, which can add robustness and flexibility to a simulation process.

As an example, a produced grid may find use in a simulation that include two-point flux approximation (e.g., at locations where a perpendicular bisector "PEBI" property is satisfied).

As an example, a grid may be constructed by computing intersections between some volumes of a background mesh and various planes of iso-depositional coordinates. In such an example the volumes of the background mesh may be defined by nodes of the background mesh. Such volumes may be tetrahedra or other shapes. Such a background mesh may be a conformal mesh that conforms to one or more types of discontinuities (e.g., geological discontinuities that include model discontinuities such as, for example, model boundaries).

Figure 14:
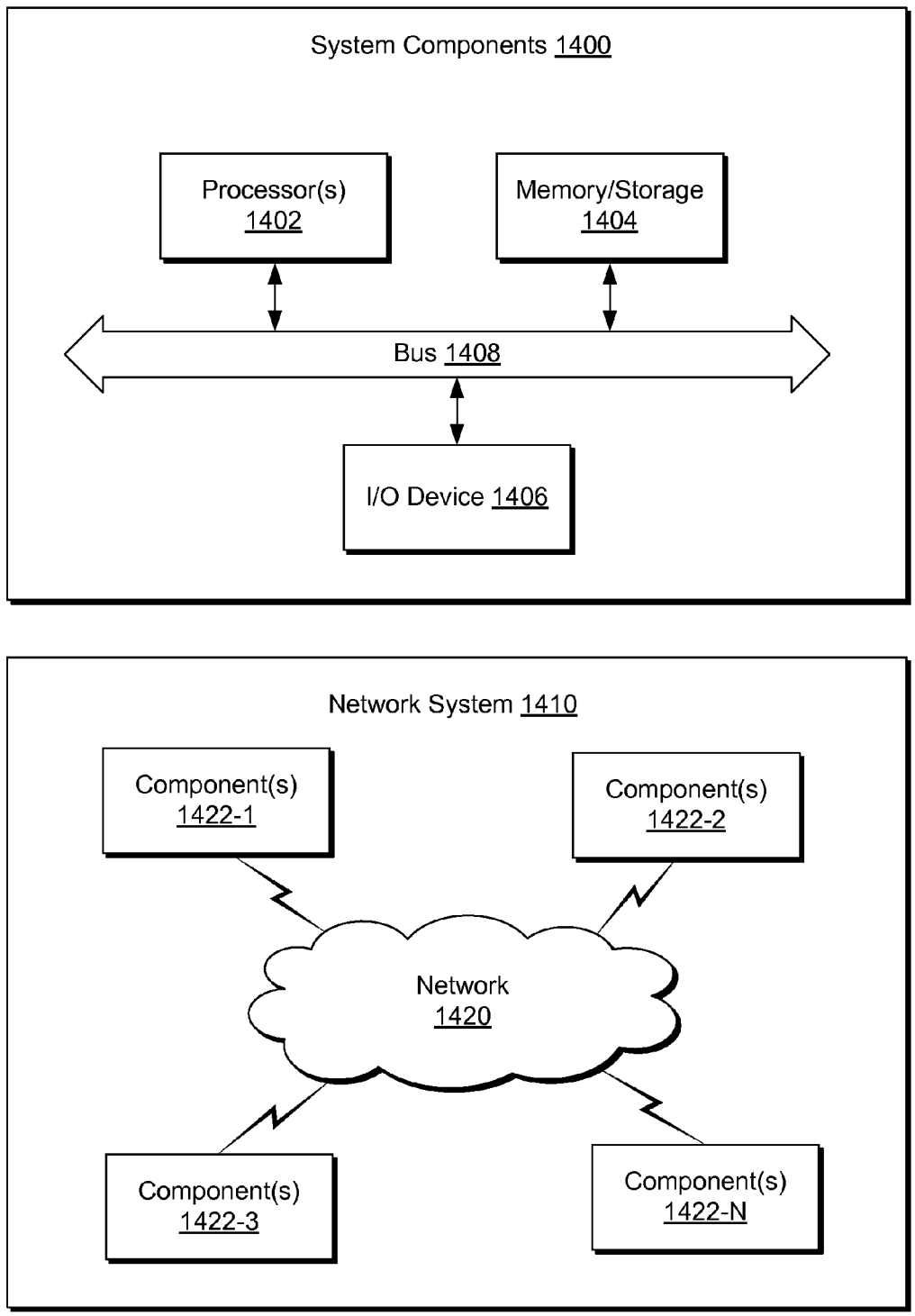
FIG. 14 illustrates example components of a system and a networked system.

FIG. 14 shows components of an example of a computing system 1400 and an example of a networked system 1410. The system 1400 includes one or more processors 1402, memory and/or storage components 1404, one or more input and/or output devices 1406 and a bus 1408. In an example embodiment, instructions may be stored in one or more computer-readable media (e.g., memory/storage components 1404). Such instructions may be read by one or more processors (e.g., the processor(s) 1402) via a communication bus (e.g., the bus 1208), which may be wired or wireless. The one or more processors may execute such instructions to implement (wholly or in part) one or more attributes (e.g., as part of a method). A user may view output from and interact with a process via an I/O device (e.g., the device 1406). In an example embodiment, a computer-readable medium may be a storage component such as a physical memory storage device, for example, a chip, a chip on a package, a memory card, etc. (e.g., a computer-readable storage medium).

In an example embodiment, components may be distributed, such as in the network system 1410. The network system 1410 includes components 1422-1, 1422-2, 1422-3, . . . 1422-N. For example, the components 1422-1 may include the processor(s) 1402 while the component(s) 1422-3 may include memory accessible by the processor(s) 1402. Further, the component(s) 1402-2 may include an I/O device for display and optionally interaction with a method. The network may be or include the Internet, an intranet, a cellular network, a satellite network, etc.

Although only a few example embodiments have been described in detail above, those skilled in the art will readily appreciate that many modifications are possible in the example embodiments. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. §112, paragraph 6 for any limitations of any of the claims herein, except for those in which the claim expressly uses the words "means for" together with an associated function.

The invention claimed is:

1. A method comprising:
   in a computing system, providing, in a geological domain coordinate system, a conformal mesh, conformal to geological discontinuities of a geological model, that comprises depositional domain coordinates associated with a depositional domain coordinate system;
   in the computing system, providing, in the depositional domain coordinate system, an initial, at least vertically structured, multidimensional grid that comprises initial nodes that define grid cells;
   analyzing, using the computing system, the conformal mesh to identify a set of grid cells of the initial grid traversed by the geological discontinuities;
   splitting, using the computing system, each of the grid cells in the set to form sub cells, each of the sub cells defined at least in part by one or more new nodes; and
   assigning, using the computing system, geological domain coordinates associated with the geological domain coordinate system to at least the new nodes to generate a final grid that comprises the initial nodes, the new nodes and geological domain coordinates associated with the geological domain coordinate system.

2. The method of claim 1 wherein the providing a conformal mesh comprises providing an unstructured conformal mesh.

3. The method of claim 1 wherein the providing a conformal mesh comprises providing an irregular conformal mesh.

4. The method of claim 1 wherein the providing an initial, at least vertically structured, multidimensional grid comprises providing an initial, at least vertically structured, multidimensional grid that comprises conformable horizons in the depositional domain coordinate system.

5. The method of claim 1 wherein the splitting comprises splitting each of the grid cells in the set to form unstructured sub cells.

6. The method of claim 1 wherein the splitting comprises splitting each of the grid cells in the set to form sub cells shaped as polyhedra.

7. The method of claim 1 wherein the conformal mesh comprises tetrahedra and wherein the nodes of the structured multidimensional grid define hexahedral grid cells.

8. The method of claim 1 wherein the splitting comprises computing an intersection between a line of the conformal mesh that represents a geological discontinuity and a line of a grid cell.

9. The method of claim 1 wherein the splitting comprises computing an intersection between a plane of the conformal mesh that represents a geological discontinuity and a plane of a grid cell.

10. The method of claim 1 wherein the geological domain coordinate system and the depositional domain coordinate system comprise three-dimensional coordinate systems.

11. The method of claim 1 further comprising performing at least one member selected from a group consisting of interpolating geological rock types for at least a portion of the final grid, interpolating petrophysical properties for at least a portion of the final grid, and simulating fluid flow for at least a portion of the final grid.

12. One or more non-transitory computer-readable storage media comprising computer-executable instructions which upon execution by a computing device perform a method to:
    access, in a geological domain coordinate system, a conformal mesh, conformal to geological discontinuities of a geological model, that comprises depositional domain coordinates associated with a depositional domain coordinate system;
    access an initial, at least vertically structured, multidimensional grid that comprises initial nodes that define grid cells and that comprise depositional domain coordinates associated with the depositional domain coordinate system;
    analyze the conformal mesh to identify a set of grid cells of the initial grid traversed by the geological discontinuities;
    split each of the grid cells in the set to form sub cells, each of the sub cells defined at least in part by one or more new nodes; and
    assign geological domain coordinates associated with the geological domain coordinate system to at least the new nodes to generate a final grid that comprises the initial nodes, the new nodes and geological domain coordinates associated with the geological domain coordinate system.

13. The one or more non-transitory computer-readable storage media of claim 12 further comprising instructions to form sets of tetrahedra, based at least in part on the conformal mesh, for each of the grid cells in the set of identified grid cells.

14. The one or more non-transitory computer-readable storage media of claim 12 wherein the instructions to split each of the grid cells comprise instructions to form new, unstructured nodes.

15. The one or more non-transitory computer-readable storage media of claim 14 wherein each of the new, unstructured nodes defines, at least in part, a sub cell of a grid cell of the set of identified grid cells.

16. One or more non-transitory computer-readable storage media comprising computer-executable instructions which upon execution by a computing device perform a method to:
    access a grid that comprises unstructured portions, the unstructured portions defined at least in part by unstructured nodes that conform to a mesh defined with respect to a depositional domain for a geological model;
    assign properties to the grid; and
    perform a simulation using the grid to simulate phenomena that depends at least in part on the assigned properties.

17. The one or more non-transitory computer-readable storage media of claim 16 wherein the instructions to perform a simulation comprise instructions to discretize equations that describe the phenomena with respect to the grid.

18. The one or more non-transitory computer-readable storage media of claim 16 wherein the grid comprises nodes associated with coordinates of a coordinate system for the depositional domain and associated with coordinates of a coordinate system for a geological domain.

19. The one or more non-transitory computer-readable storage media of claim 16 further comprising instructions to form the grid.

20. The one or more non-transitory computer-readable storage media of claim 19 wherein the instructions to form the grid comprise instructions to split cuboid grid cells of an initial grid by referencing the mesh to identify a set of grid cells of the initial grid traversed by geological discontinuities represented by the mesh.

21. A system comprising:
    a processor;
    memory accessibly by the processor;
    processor-executable instructions stored in the memory and executable by the processor to:
        access, in a geological domain coordinate system, a conformal mesh, conformal to geological discontinuities of a geological model, that comprises depositional domain coordinates associated with a depositional domain coordinate system;
        access an initial, at least vertically structured, multidimensional grid that comprises initial nodes that define grid cells and that comprise depositional domain coordinates associated with the depositional domain coordinate system;
        analyze the conformal mesh to identify a set of grid cells of the initial grid traversed by the geological discontinuities;
        split each of the grid cells in the set to form sub cells, each of the sub cells defined at least in part by one or more new nodes; and
        assign geological domain coordinates associated with the geological domain coordinate system to at least the new nodes to generate a final grid that comprises the initial nodes, the new nodes and geological domain coordinates associated with the geological domain coordinate system.

22. A system comprising:
    a processor;
    memory accessibly by the processor;
    processor-executable instructions stored in the memory and executable by the processor to:
        access a grid that comprises unstructured portions, the unstructured portions defined at least in part by unstructured nodes that conform to a mesh defined with respect to a depositional domain for a geological model;
assign properties to the grid; and
perform a simulation using the grid to simulate phenomena that depends at least in part on the assigned properties.

* * * * *